(12) United States Patent
Lee et al.

(10) Patent No.: US 9,356,671 B1
(45) Date of Patent: May 31, 2016

(54) MIMO COMMUNICATION METHOD AND SYSTEM USING THE BLOCK CIRCULANT JACKET MATRICES

(71) Applicant: INDUSTRIAL COOPERATION FOUNDATION CHONBUK NATIONAL UNIVERSITY, Jeonju-si, Jeollabuk-do (KR)

(72) Inventors: Moon Ho Lee, Jeonju-si (KR); Han Hai, Jeonju-si (KR); Xiao-Dong Zhang, Shanghai (CN)

(73) Assignee: Industrial Cooperation Foundation Chonbuk National University, Jeonju-si (KR)

( * ) Notice: Subject to any disclaimer, the term of this patent is extended or adjusted under 35 U.S.C. 154(b) by 0 days.

(21) Appl. No.: 14/688,524

(22) Filed: Apr. 16, 2015

(30) Foreign Application Priority Data

Mar. 19, 2015 (KR) .......................... 10-2015-0038319

(51) Int. Cl.
*H04B 7/02* (2006.01)
*H04B 7/04* (2006.01)
*H04B 7/08* (2006.01)

(52) U.S. Cl.
CPC ............ *H04B 7/0486* (2013.01); *H04B 7/0413* (2013.01); *H04B 7/0854* (2013.01)

(58) Field of Classification Search
CPC ... H04B 7/0486; H04B 7/0854; H04B 7/0413
See application file for complete search history.

(56) References Cited

U.S. PATENT DOCUMENTS

| | | | | |
|---|---|---|---|---|
| 2004/0171385 | A1* | 9/2004 | Haustein | H04B 7/0413 455/450 |
| 2006/0030364 | A1* | 2/2006 | Olesen | H04B 7/0617 455/562.1 |
| 2006/0280255 | A1* | 12/2006 | Hongming | H04L 5/026 375/260 |
| 2008/0037673 | A1* | 2/2008 | Ahn | H04B 7/0413 375/261 |
| 2009/0154599 | A1* | 6/2009 | Siti | H04L 1/0052 375/320 |
| 2014/0098840 | A1* | 4/2014 | Christensen | H04B 1/7105 375/148 |

FOREIGN PATENT DOCUMENTS

KR 10-2008-0049574 A 6/2008
KR 10-1446927 B1 9/2014

OTHER PUBLICATIONS

Moon Ho Lee et al., "The Fast Block Circulant Jacket Transform", Fourteenth International Workshop on Algebraic and Combinatorial Coding Theory (ACCT-XIV), Sep. 11, 2014, 17 pgs.
Korean Office Action for corresponding Application No. 10-2015-0038319 issued Dec. 1, 2015.

* cited by examiner

*Primary Examiner* — Syed Haider
(74) *Attorney, Agent, or Firm* — Sughrue Mion, PLLC

(57) ABSTRACT

Provided herein is a fast block circulant generated Hadamard matrix which is called jacket matrices of orders $N=2p,4p,4^k p, np$, wherein k is a positive integer. The block Toeplitz circulant jacket matrices possess many properties of Walsh-Hadamard Toeplitz transform and also have the construction of block circulant, which can be applied to fast algorithms for decomposition easily. The matrix decomposition is of the form of the products of block identity $I_2$ matrix and block Hadamard $H_2$ matrix. The block Toeplitz circulant jacket matrices can be applied to the Kronecker MIMO channel.

4 Claims, 8 Drawing Sheets

|  | Direct | 4p | $4^k p$ | np |
|---|---|---|---|---|
| Add. | $3(b + p)$ | $2b + 3p$ | $2^k b + 3p(2^k - 1)$ | $2b + (P - 1)n$ |
| Mult. | $4a$ | $2a$ | $2^k a$ | $2a$ |

MIMO COMMUNICATION METHOD AND SYSTEM USING THE BLOCK CIRCULANT JACKET MATRICES

CROSS-REFERENCE TO RELATED APPLICATIONS

This application claims priority from Korean Patent Application No. 10-2015-0038319 filed in the Korean Intellectual Property Office on Mar. 19, 2015, the disclosure of which is incorporated herein by reference.

BACKGROUND OF THE INVENTION

1. Field of the Invention

Methods and apparatuses consistent with the exemplary embodiments relate to MIMO (Multi-Input Multi-Output) communication, and more particularly, to an MIMO communication method and system that use a plurality of transmit antennas and a plurality of receive antennas.

2. Description of the Prior Art

Discrete orthogonal transforms, such as Walsh-Hadamard transform (WHT), discrete Fourier transform (DFT) play a key important role in digital signal and image processing applications, since orthogonal transforms can often decorrelate the components of a given signal and redistribute the energy contained in the signal so that most of energy is contained in a small number of components. For example, the Walsh-Hadamard transform(WHT) has been widespreadly using in signal processing, image processing, error-correcting codes, and orthogonal design, because of fast computational algorithm is very simplicity, i.e. +1,−1. Researches have made a considerable amount of effort to develop various kind of discrete orthogonal transforms. Since the orthogonal transform with the independent parameters can carry many different characterisation of digital signals, it is interesting to investigate the possibility of generalization of WHT which is the Jacket transform. Generalized, the Jacket matrices idea is from center weighted Hadamard matrices.

The transforms with special structure are desirable. Although there exist circulant Hadamard matrices of order 1 and order 4, one conjectures that there do not exist any circulant Hadamard matrices of order at least 5. Thus, there is a need to develop a method for construction of block Toeplitz circulant Jacket transform of or above order 5, and a way to apply the method to MIMO communciation.

SUMMARY OF THE INVENTION

Therefore, a purpose of various embodiments of the present disclosure is to resolve the aforementioned problems, that is, to provide a method for estimating an MIMO channel using a block circulant jacket matrix of or above order 5, and a system where the method is applied.

According to an embodiment of the present disclosure, there is provided an MIMO communication method, including receiving a transmit signal; and estimating a channel using a receive signal, wherein the estimating estimates the channel using formula:

$$Y = \sqrt{\frac{E_x}{N_T}} HX + Z$$

Y being the receive signal, $E_x$ being an energy of the transmit signal, $N_T$ being a number of transmit antennas, X being the transmit signal, Z being noise, and H being a channel matrix comprising a BCJM (Block Circulant Jacket Matrix) of order n (>4).

The H may be expressed by formula: $H = R_r^{1/2} H_w R_t^{1/2}$, $R_r^{1/2}$ being a matrix where correlation between transmit antennas are reflected, $H_w$ being a channel gain matrix, and $R_t^{1/2}$ being a matrix where a correlation between receive antennas are reflected.

The $R_t$ may be expressed by the BCJM.

The BCJM may be $[C]_{np}$ in $$[C]_{np} = \begin{pmatrix} C_0 & C_1 & C_2 & C_3 & \cdots & C_{n-2} & C_{n-1} \\ C_{n-1} & C_0 & C_1 & C_2 & \cdots & C_{n-3} & C_{n-2} \\ \cdots & \cdots & \cdots & \cdots & \ddots & \cdots & \cdots \\ C_1 & C_2 & C_3 & C_4 & \cdots & C_{n-1} & C_0 \end{pmatrix}$$

$C_0, \ldots, C_{n-1}$ being a p×p packet matrix.

The BCJM may be a block circulant jacket matrix $[C]_{4p}$ of order 4p of $$[C]_{4p} = \begin{pmatrix} C_0 & C_1 & C_2 & C_3 \\ C_3 & C_0 & C_1 & C_2 \\ C_2 & C_3 & C_0 & C_1 \\ C_1 & C_2 & C_3 & C_0 \end{pmatrix}$$

$C_i$ (i=0,1,2,3) being a p×p packet matrix.

According to an embodiment of the present disclosure, there is provided an MIMO communication apparatus including $N_R$ receive antennas for receiving a transmit signal from a transmit end; and a receive end for estimating a channel using the receive signal received through the receive antennas, wherein the receive end estimates the channel using formula:

$$Y = \sqrt{\frac{E_x}{N_T}} HX + Z$$

Y being the receive signal, Ex being an energy of the transmit signal, NT being a number of transmit antennas, X being the transmit signal, Z being noise, and H being a channel matrix comprising a BCJM (Block Circulant Jacket Matrix) of order n (>4).

As aforementioned, according to various embodiments of the present disclosure, it is possible to estimate a channel by fast computation using block circulant Jacket matrices, thereby improving the speed of estimating a channel, and improving an MIMO channel capacity.

BRIEF DESCRIPTION OF THE DRAWINGS

The above and/or other aspects of the present disclosure will be more apparent by describing certain present disclosure with reference to the accompanying drawings, in which.

DETAILED DESCRIPTION

Figure 1:
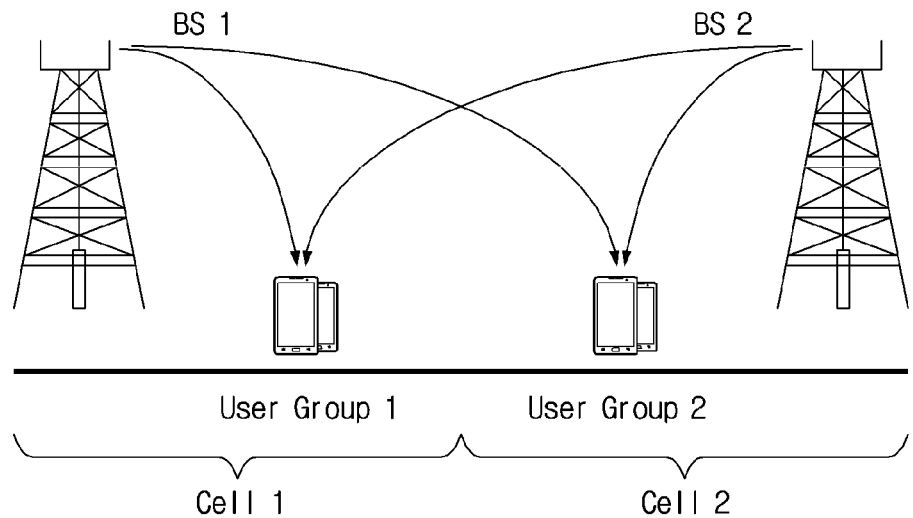
FIG. 1 illustrates a one-dimensional cellular system consisting of two base stations and four symmetrically disposed user groups.

Certain exemplary embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

Hereinafter, the present disclosure will be explained in more detail with reference to the figures.

An embodiment of the present disclosure presents a fast block circulant generated Hadamard which is called jacket matrices of orders $N=2p, 4p, 4^k p, np$, wherein k is a positive integer.

The class of block Toeplitz circulant Jacket matrices not only possess many properties of Walsh-Hadamard Toeplitz transform but also have the construction of block circulant, which can be applied to fast algorithms for decomposition easily. The matrix decomposition is of the form of the products of block identity $I_2$ matrix and block Hadamard $H_2$ matrix.

In the embodiment of the present disclosure, the block Toeplitz circulant Jacket transform can be applied to the Kronecker MIMO channel.

Definition 1.1: Let $A=(a_{jk})$ be an n×n matrix whose elements are in a field F (including real fields, complex fields, finite fields, etc.). Denote by $A^\dagger$ as the transpose matrix of the element-wise inverse of A, that is, $A^{554}=(a_{jk}^{-1})$. Then A is called a Jacket matrix if $AA^\dagger=A^\dagger A=nI_n$, where $I_n$ is the identity matrix over the field F. Then, we can easily calculate the inverse of large matrices.

For example, given a matrix, A, and its element-wise inverse transpose, $A^\dagger$, as $$A = \begin{pmatrix} a & \sqrt{ac} \\ \sqrt{ac} & -c \end{pmatrix}, A^\dagger = \begin{pmatrix} \frac{1}{a} & \frac{1}{\sqrt{ac}} \\ \frac{1}{\sqrt{ac}} & -\frac{1}{c} \end{pmatrix}, \quad (1)$$

We say A is a 2×2 Jacket matrix. As a special case, when $a=c=1$, then a 2×2 Hadamard matrix.

Definition 1.2: Let A be an n×n matrix. If there exists a Jacket matrix J such that $A=JDJ^{-1}$, where D is a diagonal matrix, then we say that A is Jacket similar to the diagonal matrix D. We say that A is Jacket diagonalisable.

Definition 1.3: Let $$[C]_N = \begin{pmatrix} C_0 & C_1 \\ C_1 & C_0 \end{pmatrix}$$

be 2×2 block matrix of order N=2p. If $[C_0]_p$ and $[C_1]_p$ are p×p Jacket matrices, then $[C]_N$ is block circulant Jacket matrix if and only if $C_0 C_1^{RT} + C_1^{RT} C_0 = [0]_N$, where RT is reciprocal transpose.

On the while, let $X_n$ be a discrete time random process with expectation $E(X_i)=m_i$ and covariance function $Cov(X_i, X_j)=E((X_i-m_i)(X_j-m_j))$. One of the interesting progress is that $m_i$ is constant which is not dependent on i and $K_n=[Cov(X_i,X_j); i,j=1, \ldots, n]$ is Toeplitz matrix. This result deals with the asymptotic behavior of the eigenvalues of an n×n Hermitian Toeplitz matrix $T_n=(t_{j-k})_{j,k=1}^n$, where the complex numbers $t_k$ with $k \in Z$ are the Fourier coefficients of a bounded function called the symbol of the sequence $T_n$. This progress is called weakly stationary, which has many application in signal processing theory. There is a common special case circulant matrix of Toeplitz matrices, which plays a fundamental role in developing more general results. However, there are random progress whose covariance matrix is not circulant matrix, but is block circulant matrix. With the result of the above results, we are able to analysis the behavior of the eigenvalues and the other properties.

Therefore, If A is Jacket similar to the diagonal matrix D, then the main diagonal entries of D are all eigenvalues. Furthermore, since $A=JDJ^{-1}$, we have $D=J^{-1}AJ$. Note that since J is a Jacket matrix, its inverse is easy to obtain, that is, $$J_{n \times n}^{-1} = \frac{J_{n \times n}^\dagger}{n}.$$

Hence we can directly calculate the eigenvalues of A by $$D = \frac{J^\dagger A J}{n}.$$

In the present embodiment, a class of matrices that may have eigenvalue decomposition (EVD) through Jacket matrices are dealt with. Then it is applied to precoding and decoding of distributive-MIMO channels in wireless communications.

An N×N matrix $[C]_N$ is said to be a block circulant matrix if it has the following form:

$$A = \begin{pmatrix} C_0 & C_1 & C_2 & \ldots & C_{n-2} & C_{n-1} \\ C_{n-1} & C_0 & C_1 & \ldots & C_{n-3} & C_{n-2} \\ C_{n-2} & C_{n-1} & C_0 & \ldots & C_{n-4} & C_{n-3} \\ \ldots & \ldots & \ldots & \ddots & \ldots & \ldots \\ C_2 & C_3 & C_4 & \ldots & C_0 & C_1 \\ C_1 & C_2 & C_3 & \ldots & C_{n-1} & C_0 \end{pmatrix}, \quad (2)$$

where N=np and the $C_i$ are p×p submatrices (block) of complex or real-valued elements for $i=0, \ldots, n-1$. Hence an N×N matrix $[C]_N=(C_{jk})$ is an block circulant matrix with p×p blocks $C_{j_1,k_1}=C_{j_2,k_2}$, whenever $(j_1-k_1)-(j_2-k_2)=0$, or n or −n. When p=1, the matrix is simply an N×N circulant matrix.

For an N×N matrix $[J]_N$, the N×N associated matrix matrix $[J]_N^{RT}$ is obtained from matrix $[J]_N$ by taking the reciprocal of each entry of and exchanging its row and column indices. In other words, the (k,i) entry of $[J]_N^{RT}$ is equal to the reciprocal of the element in the (i,k) position in $[J]_N$. The jacket matrices are mutually orthogonal.

Definition 2.1: An N×N complex matrix $[J]_N=(j_{i,k})$ is called a Jacket matrix, if $[J]_N$ is invertible and the element in the entries (i,k) of its inverse matrix is equal to product of 1/N and the inverse of the element in the entries (k,i) of $[J]_N$. In other words, if $$[J]_N = \begin{pmatrix} j_{0,0} & j_{0,1} & \cdots & j_{0,N-1} \\ j_{1,0} & j_{1,1} & \cdots & j_{1,N-1} \\ \cdots & \cdots & \cdots & \cdots \\ j_{N-1,0} & j_{N-1,1} & \cdots & j_{N-1,N-1} \end{pmatrix}, \text{ and,} \quad (3)$$

$$[J]_N^{-1} = \frac{1}{N}[J]^{RT} = \begin{pmatrix} \frac{1}{j_{0,0}} & \frac{1}{j_{1,0}} & \cdots & \frac{1}{j_{N-1,0}} \\ \frac{1}{j_{0,1}} & \frac{1}{j_{1,1}} & \cdots & \frac{1}{j_{N-1,1}} \\ \cdots & \cdots & \cdots & \cdots \\ \frac{1}{j_{0,N-1}} & \frac{1}{j_{1,N-1}} & \cdots & \frac{1}{j_{N-1,N-1}} \end{pmatrix}. \quad (4)$$

An N×N matrix $[C]_N=(C_{jk})$ with blocks p×p and N=np is called BCJM (block circulant Jacket matrix) if it is also Jacket matrix. In particular, whenever p=1, the block circulant Jacket matrices are just circulant Jacket matrices.

For example, the well-known Hadamard matrices are Jacket matrices family.

The 2×2 Jacket matrix is as follows:

$$[H]_2 = \begin{pmatrix} 1 & 1 \\ 1 & -1 \end{pmatrix}, \quad (5)$$

is both the Hadamard matrix and Jacket matrix. But it is not circulant matrix. Hence $[H]_2$ is not circulant Jacket matrix. In fact, up to now, the only known circulant Hadamard matrices are $[H]_1=(1)$ and $[H]_4$:

$$[H]_4 = \begin{pmatrix} 1 & 1 & 1 & 1 \\ 1 & 1 & 1 & 1 \\ 1 & 1 & 1 & 1 \\ 1 & 1 & 1 & 1 \end{pmatrix} - 2 \begin{pmatrix} 1 & 0 & 0 & 0 \\ 0 & 1 & 0 & 0 \\ 0 & 0 & 1 & 0 \\ 0 & 0 & 0 & 1 \end{pmatrix} \quad (6)$$

$$= \begin{pmatrix} -1 & 1 & 1 & 1 \\ 1 & -1 & 1 & 1 \\ 1 & 1 & -1 & 1 \\ 1 & 1 & 1 & -1 \end{pmatrix} \Rightarrow \begin{pmatrix} C_0 & C_1 \\ C_1 & C_0 \end{pmatrix}.$$

It is conjectured that there do not exist other circulant Hadamard matrices. The concept of modular Hadamard matrices resurfaced in the engineering literature recently during the course of the investigation of Jacket matrices. But it will be different for conventional Jacket matrices. For example, $$[J]_2 = \begin{pmatrix} a & ai \\ ai & a \end{pmatrix}, \quad (7)$$

for all any nonzero complex number a is a circulant Jacket matrix. Let $\omega$ be complex 3-th roots of unity, i.e., $\omega^3=1$ and $\omega \neq 1$. Then $$[J]_3 = \begin{pmatrix} 1 & \omega & 1 \\ 1 & 1 & \omega \\ \omega & 1 & 1 \end{pmatrix}, \quad (8)$$

is also circulant Jacket matrix of order 3. There are only two types circulant Jacket matrices of order 4.

Definition 2.2: Let $[J]_4$ be a circulant Jacket matrix. Then $$[J]_4 = \begin{pmatrix} a_0 & a_1 & a_0 & -a_1 \\ -a_1 & a_0 & a_1 & a_0 \\ a_0 & -a_1 & a_0 & a_1 \\ a_1 & a_0 & -a_1 & a_0 \end{pmatrix}. \text{ and} \quad (9)$$

$$[J]_4 = \begin{pmatrix} a_0 & a_1 & -a_0 & a_1 \\ a_1 & a_0 & a_1 & -a_0 \\ -a_0 & -a_1 & a_0 & a_1 \\ a_1 & -a_0 & -a_1 & a_0 \end{pmatrix}. \quad (10)$$

Proof. Since $[J]_4$ is circulant matrix of order 4, let $$[J]_4 = \begin{pmatrix} a_0 & a_1 & a_2 & a_3 \\ a_3 & a_0 & a_1 & a_2 \\ a_2 & a_3 & a_0 & a_1 \\ a_1 & a_2 & a_3 & a_0 \end{pmatrix}.$$

be Jacket matrix of order 4. Hence by the definition of Jacket matrix, we have $$\frac{a_0}{a_3} + \frac{a_1}{a_0} + \frac{a_2}{a_1} + \frac{a_3}{a_2} = 0, \quad (11)$$

$$\frac{a_0}{a_2} + \frac{a_1}{a_3} + \frac{a_2}{a_0} + \frac{a_3}{a_1} = 0, \quad (12)$$

$$\frac{a_0}{a_1} + \frac{a_1}{a_2} + \frac{a_2}{a_3} + \frac{a_3}{a_0} = 0. \quad (13)$$

Then equations (11) and (13) implies that $$\left(\frac{a_0}{a_3} + \frac{a_1}{a_0} + \frac{a_2}{a_1}\right)\left(\frac{a_0}{a_1} + \frac{a_1}{a_2} + \frac{a_3}{a_0}\right) = \left(-\frac{a_3}{a_2}\right)\left(-\frac{a_2}{a_3}\right). \quad (14)$$

By rearranging equation (14), we have $$\left(1 + \frac{a_0 a_1}{a_2 a_3}\right)\left(1 + \frac{a_1 a_3}{a_0^2}\right)\left(1 + \frac{a_0 a_2}{a_1^2}\right) = 0. \quad (15)$$

By (15), we consider the following three cases.

Case 1:

$$1 + \frac{a_1 a_3}{a_0^2} = 0,$$

i.e., $$a_3 = -\frac{a_0^2}{a_1}.$$

Substituting $a_3$ in (11) yields $$\frac{a_0 a_1}{-a_0^2} + \frac{a_1}{a_0} + \frac{a_2}{a_1} + \frac{-a_0^2}{a_1 a_2} = 0.$$

Thus $a_2 = \pm a_0$.

If $a_2 = a_0$, substituting $a_3$ and $a_2$ in (12) yields $a_1 = \pm a_0$. Therefore, $$[J]_4 = \begin{pmatrix} a_0 & \pm a_0 & a_0 & \mp a_0 \\ \mp a_0 & a_0 & \pm a_0 & a_0 \\ a_0 & \mp a_0 & a_0 & \pm a_0 \\ \pm a_0 & a_0 & \mp a_0 & a_0 \end{pmatrix}, \quad (16)$$

for all nonzero complex number $a_0$.

If $a_2 = -a_0$, substituting $a_3$ and $a_2$ in (12) yields $a_1 = \pm a_0 i$, where $I^2 = 1$. Therefore, $$[J]_4 = \begin{pmatrix} a_0 & \pm a_0 i & a_0 & \mp a_0 i \\ \mp a_0 i & a_0 & \pm a_0 i & a_0 \\ a_2 & \mp a_0 i & a_0 & \pm a_0 i \\ \pm a_0 i & a_0 & \mp a_0 i & a_0 \end{pmatrix}. \quad (17)$$

Case 2:

$$1 + \frac{a_0 a_2}{a_1^2} = 0,$$

i.e., $$a_2 = -\frac{a_1^2}{a_0}.$$

Substituting $a_2$ in equation (11) yields $$\frac{a_0}{a_3} + \frac{a_1}{a_0} + \frac{-a_1^2}{a_0 a_1} + \frac{a_3 a_0}{-a_2^2} = 0.$$

So $a_3 = \pm a_1$.

If $a_3 = a_1$, substituting $a_3$ and $a_2$ in equation (12) yields that $a_1 = \pm a_0$, which implies $a_2 = -a_0$ and $a_3 = \pm a_0$. So $$[J]_4 = \begin{pmatrix} a_0 & \pm a_0 & -a_0 & \pm a_0 \\ \pm a_0 & a_0 & \pm a_0 & -a_0 \\ -a_0 & \pm a_0 & a_0 & \pm a_0 \\ \pm a_0 & -a_0 & \pm a_0 & a_0 \end{pmatrix}. \quad (18)$$

If $a_3 = -a_1$, substituting $a_2, a_3$ in equation (12) yields $$\frac{a_0^2}{-a_1^2} + \frac{a_1}{-a_1} + \frac{-a_1^2}{a_0^2} + \frac{-a_1}{a_1} = 0.$$

Hence $a_1 = \pm a_0 i, a_2 = a_0$ and $a_3 = \mp a_0 i$. Therefore $$[J]_4 = \begin{pmatrix} a_0 & \pm a_0 i & a_0 & \mp a_0 i \\ \mp a_0 i & a_0 & \pm a_0 i & a_0 \\ a_0 & \mp a_0 i & a_0 & \pm a_0 i \\ \pm a_0 i & a_0 & \mp a_0 i & a_0 \end{pmatrix}. \quad (19)$$

Case 3:

$$1 + \frac{a_0 a_1}{a_2 a_3} = 0,$$

i.e, $$a_3 = \frac{-a_0 a - 1}{a_2}.$$

substituting $a_3$ in equation (11) yields $$\frac{a_0 a_2}{-a_0 a_1} + \frac{a_1}{a_0} + \frac{a_2}{a_0} + \frac{-a_0 a_1}{a_2^2} = 0.$$

So $a_2 = \pm a_0$. Then $a_3 = \mp a_1$. Therefore $$[J]_4 = \begin{pmatrix} a_0 & a_1 & \pm a_0 & \mp a_1 \\ \mp a_1 & a_0 & a_1 & \pm a_0 \\ \pm a_0 & \mp a_1 & a_0 & a_1 \\ a_1 & \pm a_0 & \mp a_1 & a_0 \end{pmatrix}. \quad (20)$$

Block Circulant Jacket Matrices of Orders $2p, 4p, 4^k p, np$

Hereinafter, some block Jacket matrices are presented.

A. Block Circulant Jacket Matrices of Order $2p$

Definition 3.1: Let $$[C]_N = \begin{pmatrix} C_0 & C_1 \\ C_1 & C_0 \end{pmatrix}$$

be $2 \times 2$ block matrix of order $N = 2p$. If $[C_0]_p$ and $[C_1]_p$ are $p \times p$ Jacket matrices, then $[C]_N$ is a Jacket matrix if and only if $$C_0 C_1^{RT} + C_1^{RT} C_0 = [0]_N, \quad (21)$$

where RT is reciprocal transpose.

Proof. Since $C_0$ and $C_1$ are Jacket matrices, we have $C_0 C_0^{RT} = p[I]_p$ and $C_1 C_1^{RT} = p[I]_p$. Note that $[C]_N$ is Jacket matrix if and only if $[C][C]^{RT} = N[I]_N$. Then $C$ is Jacket matrix if and only if $$[C][C]^{RT} = \begin{pmatrix} C_0 & C_1 \\ C_1 & C_0 \end{pmatrix} \begin{pmatrix} C_0 & C_1 \\ C_1 & C_0 \end{pmatrix}^{RT} = \begin{pmatrix} 2p[I]_p & C_0 C_1^{RT} + C_1^{RT} C_0 \\ C_0 C_1^{RT} + C_1^{RT} C_0 & 2p[I]_p \end{pmatrix} = N[I]_N.$$

Hence $[C]_N$ is a Jacket matrix if and only if $$C_0 C_1^{RT} + C_1^{RT} C_0 = [0]_N.$$

By using Definition 3.1, we may construct many block ciculant Jacket matrices.

Example 1. Let $$C_0 = \begin{pmatrix} 1 & 1 \\ 1 & -1 \end{pmatrix}, C_1 = \begin{pmatrix} a & -a \\ -\frac{1}{a} & -\frac{1}{a} \end{pmatrix}.$$

Since $C_0 C_0^{RT} = 2[I]_2$ and $C_1 C_1^{RT} = 2[I]_2$, $C_0$ and $C_1$ are Jacket matrices of order 2. Moreover, $$C_0 C_1^{RT} + C_1^{RT} C_0 = \begin{pmatrix} 1 & 1 \\ 1 & -1 \end{pmatrix} \begin{pmatrix} -\frac{1}{a} & -a \\ \frac{1}{a} & -a \end{pmatrix} + \begin{pmatrix} a & -a \\ -\frac{1}{a} & -\frac{1}{a} \end{pmatrix} \begin{pmatrix} 1 & 1 \\ 1 & -1 \end{pmatrix} = [0]_2.$$

Hence a circulant matrix $$C = \begin{pmatrix} C_0 & C_1 \\ C_1 & C_0 \end{pmatrix} = \begin{pmatrix} 1 & 1 & a & -a \\ 1 & -1 & -\frac{1}{a} & -\frac{1}{a} \\ a & -a & 1 & 1 \\ -\frac{1}{a} & -\frac{1}{a} & 1 & -1 \end{pmatrix} = \begin{pmatrix} 1 & 1 & 1 & -1 \\ 1 & -1 & -1 & -1 \\ 1 & -1 & 1 & 1 \\ -1 & -1 & 1 & -1 \end{pmatrix}_{a=1}.$$

is a block circulant Jacket matrix. $C_o$ is applied to MIMO 2×2 spatial correlation channel.

Figure 2:
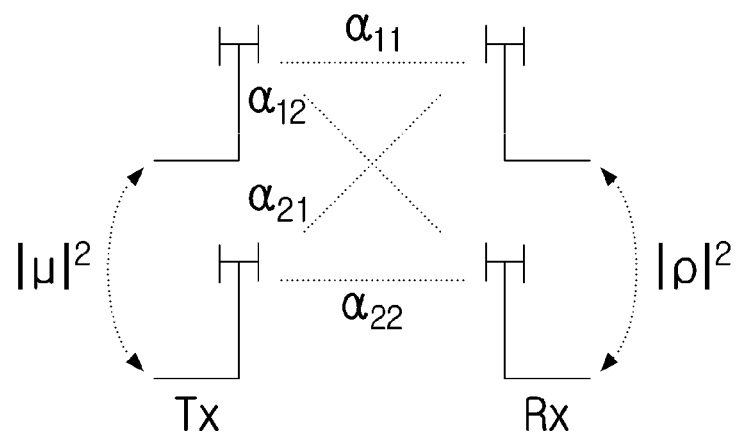
FIG. 2 illustrates a 2×2 spatial correlated MIMO channel.
Figure 5:
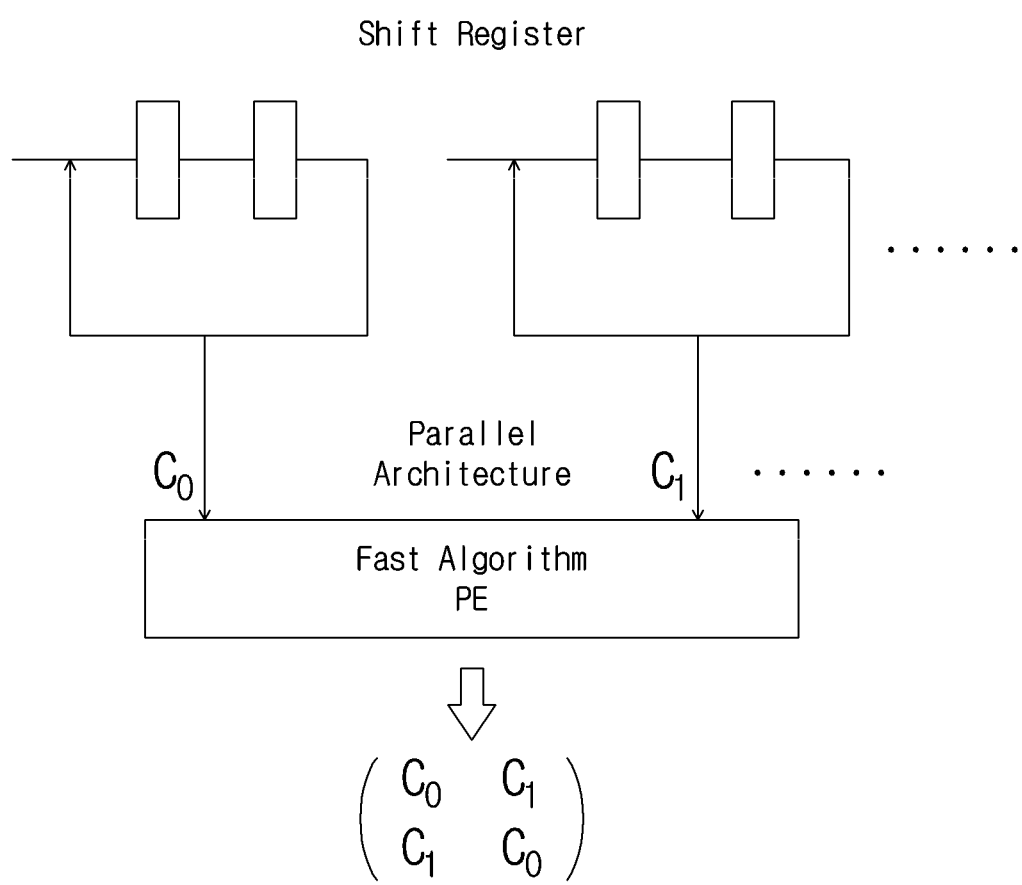
FIG. 5 illustrates a BCJM encoding block.

Circulant submatrices of size 2×2, i.e., such that each submatrix has the property that all rows are cyclic shifts of the first row and all columns are cyclic shifts of the first column as shown in FIG. 5. We shall refer to these submatrices as circulant blocks. Also, we define users equivalence classes as the sets of user groups whose corresponding columns of Hadamard form circulant blocks. FIG. 1 shows a one-dimensional cellular system comprising two base stations and four symmetrically located user groups. FIG. 2 shows the 2×2 spatial correlated MIMO channel. Herein, μ and ρ re Tx-Rx correlations, 2⊗2 is given as spatial correlations matrix calculation.

When this symmetry condition holds, users in the same equivalence class are statistically equivalent, up to renumbering of the base stations.

A circulant matrix is fully specified by one vector which appears as the first column. Circulant matrices are important because they are digitalization by the DFT, and hence linear equations that contain them can be quickly solved using the fast Fourier transform (FFT) or orthogonal transform.

B. Block Circulant Jacket Matrices of Order 4p

Hereinafter, a novel class of block circulant Jacket matrices of order 4p will be presented.

Definition 3.2: Let $$[C]_{4p} = \begin{pmatrix} C_0 & C_1 & C_2 & C_3 \\ C_3 & C_0 & C_1 & C_2 \\ C_2 & C_3 & C_0 & C_1 \\ C_1 & C_2 & C_3 & C_0 \end{pmatrix}$$

be a block circulant matrix of order 4p. If $C_i$ is a p×p Jacket matrix for i=0,1,2,3 then $[C]_{4p}$ is Jacket matrix if and only if the following condition holds.

$$C_0 C_3^{RT} + C_1 C_0^{RT} + C_2 C_1^{RT} + C_3 C_2^{RT} = 0, \quad (22)$$

$$C_0 C_2^{RT} + C_1 C_3^{RT} + C_2 C_0^{RT} + C_3 C_1^{RT} = 0, \quad (23)$$

$$C_0 C_1^{RT} + C_1 C_2^{RT} + C_2 C_3^{RT} + C_3 C_0^{RT} = 0, \quad (24)$$

Proof. Let $$P = \begin{pmatrix} 0 & 1 & 0 & 0 \\ 0 & 0 & 1 & 0 \\ 0 & 0 & 0 & 1 \\ 1 & 0 & 0 & 0 \end{pmatrix}.$$

Then C can be rewritten as $$C = [I]_4 \otimes C_0 + P \otimes C_1 + P^2 \otimes C_2 + P^3 \otimes C_3,$$

where $\otimes$ is the Kronecker product. Then C is Jacket matrix if and only if $CC^{RT} = N[I]_N$.

On the other hand, $C^{RT} = [I]_4 \otimes C_0^{RT} + P \otimes C_3^{RT} + P^2 \otimes C_2^{RT} + P^3 \otimes C_1^{RT}$.

Hence $$CC^{RT} = [I]_4 \otimes (C_0 C_0^{RT}) + P \otimes (C_0 C_3^{RT}) + P^2 \otimes (C_0 C_2^{RT}) + \\ P^3 \otimes (C_0 C_1^{RT}) + [I]_4 \otimes (C_1 C_1^{RT}) + P \otimes (C_1 C_0^{RT}) + P^2 \otimes \\ (C_1 C_3^{RT}) + P^3 \otimes (C_1 C_2^{RT}) + [I]_4 \otimes (C_2 C_2^{RT}) + P \otimes \\ (C_2 C_1^{RT}) + P^2 \otimes (C_2 C_0^{RT}) + P^3 \otimes (C_2 C_3^{RT}) + [I]_4 \otimes \\ (C_3 C_3^{RT}) + P \otimes (C_3 C_2^{RT}) + P^2 \otimes (C_3 C_1^{RT}) + P^3 \otimes \\ (C_3 C_0^{RT}) = N[I]_4 \otimes [I]_p + P \otimes (C_0 C_3^{RT} + C_1 C_0^{RT} + C_2 C_1^{RT} + \\ C_3 C_2^{RT}) + P^2 \otimes (C_0 C_2^{RT} + C_1 C_3^{RT} + C_2 C_0^{RT} + C_3 C_1^{RT}) + P^3 \otimes \\ (C_0 C_1^{RT} + C_1 C_2^{RT} + C_2 C_3^{RT} + C_3 C_0^{RT}).$$

Hence $[C]_N$ is Jacket matrix if and only equations (22), (23) and (24) hold.

From Theorem 3.2, we are able to construct block circulant Jacket matrices by choosing proper matrices $C_0, C_1, C_2, C_3$ such that they satisfy equation (22),(23) and (24). For example, let $C_2 = \pm C_0$ and $C_3 = \mp C_1$ be Jacket matrices. Then $$C_0 C_3^{RT} + C_1 C_0^{RT} + C_2 C_1^{RT} + C_3 C_2^{RT} = -C_0 C_1^{RT} + \\ C_1 C_0^{RT} + C_0 C_1^{RT} - C_1 C_0^{RT} = 0,$$

$$C_0 C_2^{RT} + C_1 C_3^{RT} + C_2 C_0^{RT} + C_3 C_1^{RT} = C_0 C_0^{RT} - C_1 C_1^{RT} + \\ C_0 C_0^{RT} - C_1 C_1^{RT} = 0,$$

$$C_0 C_1^{RT} + C_1 C_2^{RT} + C_2 C_3^{RT} + C_3 C_0^{RT} = C_0 C_1^{RT} + C_1 C_0^{RT} - \\ C_0 C_1^{RT} - C_1 C_0^{RT} = 0.$$

Hence if $C_0$ and $C_1$ are Jacket matrices, then $$[C]_{4p} = \begin{pmatrix} C_0 & C_1 & C_0 & -C_1 \\ -C_1 & C_0 & C_1 & C_0 \\ C_0 & -C_1 & C_0 & C_1 \\ C_1 & C_0 & -C_1 & C_0 \end{pmatrix}$$

is a block circulant Jacket matrix.

Example 2 Let $$C_0 = \begin{pmatrix} 1 & i \\ i & 1 \end{pmatrix}; C_1 = \begin{pmatrix} 1 & -i \\ -i & 1 \end{pmatrix},$$

where $I^2 = -1$. It is easy to see that $C_0, C_1$ are Jacket matrices. Hence there is a block circulant Jacket matrix of order 8 in (25).

$$[C]_8 = \begin{pmatrix} C_0 & C_1 & C_0 & -C_1 \\ -C_1 & C_0 & C_1 & C_0 \\ C_0 & -C_1 & C_0 & C_1 \\ C_1 & C_0 & -C_1 & C_0 \end{pmatrix} \quad (25)$$

$$= \begin{pmatrix} 1 & i & 1 & -i & 1 & i & -1 & i \\ i & 1 & -i & 1 & i & 1 & i & -1 \\ -1 & i & 1 & i & 1 & -i & 1 & i \\ i & -1 & i & 1 & -i & 1 & i & 1 \\ 1 & i & -1 & i & 1 & i & 1 & -i \\ i & 1 & i & -1 & i & 1 & -i & 1 \\ 1 & -i & 1 & i & -1 & i & 1 & i \\ -i & 1 & i & 1 & i & -1 & 1 & i \end{pmatrix}.$$

Example 3 Let W be the complex root of unitary and $$C_0 = \begin{pmatrix} 1 & w & w \\ w & 1 & w \\ w & w & 1 \end{pmatrix} \text{ and } C_1 = \begin{pmatrix} 1 & 1 & w^2 \\ w^2 & 1 & 1 \\ 1 & w^2 & 1 \end{pmatrix}.$$

Then $[C]_{12}$ in (26) is a block circulant Jacket matrix.

$$[C]_{12} = \begin{pmatrix} C_0 & C_1 & C_0 & -C_1 \\ -C_1 & C_0 & C_1 & C_0 \\ C_0 & -C_1 & C_0 & C_1 \\ C_1 & C_0 & -C_1 & C_0 \end{pmatrix}$$

Example 4 Let $$C_0 = \begin{pmatrix} 1 & 1 \\ 1 & -1 \end{pmatrix}, C_1 = \begin{pmatrix} a & -a \\ \frac{1}{a} & \frac{1}{a} \end{pmatrix},$$

$C_3 = iC_1C_3 = iC_0$.

Then $$[C]_{4p} = \begin{pmatrix} C_0 & C_1 & C_2 & C_3 \\ C_3 & C_0 & C_1 & C_2 \\ C_2 & C_3 & C_0 & C_1 \\ C_1 & C_2 & C_3 & C_0 \end{pmatrix}$$

is block circulant Jacket matrix.

C. Block Circulant Jacket Matrices of Order $N=4^k p$

Hereinafter, block circulant Jacket matrices of order $N=4^k p$ with p×p blocks will be explained, where p is any integer. Let $[C_0]_p$ and $[C_1]_p$ are any two p×p Jacket matrices. Then the block circulant Jacket matrix of order 4p is defined to be $$[C]_{4p} = : \begin{pmatrix} C_0 & C_1 & C_0 & -C_1 \\ -C_1 & C_0 & C_1 & C_0 \\ C_0 & -C_1 & C_0 & C_1 \\ C_1 & C_0 & -C_1 & C_0 \end{pmatrix}.$$

It has been proven that $[C]_{4p}$ is block circulant Jacket matrix. For any two block circulant two matrices $[C]_{4^k p}$ and $[D]_{4^k p}$ of order $4^k p$. The block cirulant matrix of order $4^{k+1} p$ with p×p block is defined to be (26)

$$= \begin{pmatrix} 1 & w & w & 1 & 1 & w^2 & 1 & w & w & -1 & -1 & -w^2 \\ w & 1 & w & w^2 & 1 & 1 & w & 1 & w & -w^2 & -1 & -1 \\ w & w & 1 & 1 & w^2 & 1 & w & w & 1 & -1 & -w^2 & -1 \\ -1 & -1 & -w^2 & 1 & w & w & 1 & 1 & w^2 & 1 & w & w \\ -w^2 & -1 & -1 & w & 1 & w & w^2 & 1 & 1 & w & 1 & w \\ -1 & -w^2 & -1 & w & w & 1 & 1 & w^2 & 1 & w & w & 1 \\ 1 & w & w & -1 & -1 & -w^2 & 1 & w & w & 1 & 1 & w^2 \\ w & 1 & w & -w^2 & -1 & -1 & w & 1 & w & w^2 & 1 & 1 \\ w & w & 1 & -1 & -w^2 & -1 & w & w & 1 & 1 & w^2 & 1 \\ 1 & 1 & w^2 & 1 & w & w & -1 & -1 & -w^2 & 1 & w & w \\ w^2 & 1 & 1 & w & 1 & w & -w^2 & -1 & -1 & w & 1 & w \\ 1 & w^2 & 1 & w & w & 1 & -1 & -w^2 & -1 & w & w & 1 \end{pmatrix}$$

$$[C]_{4^{k+1}p} := \begin{pmatrix} [C]_{4^k p} & [D]_{4^k p} & [C]_{4^k p} & -[D]_{4^k p} \\ -[D]_{4^k p} & [C]_{4^k p} & [D]_{4^k p} & [C]_{4^k p} \\ [C]_{4^k p} & -[D]_{4^k p} & [C]_{4^k p} & [D]_{4^k p} \\ [D]_{4^k p} & [C]_{4^k p} & -[D]_{4^k p} & [C]_{4^k p} \end{pmatrix}.$$

It can be seen that block cirulant matrix $[C]_{4^{k+1}p}$ of order $4^{k+1}p$ is Jacket matrix.

D. Block Circulant Jacket Matrices of Order np

Definition 3.3: Let $C_0$ and $C_1$ be two p×p Jacket matrices. Let $$[C]_{np} = \begin{pmatrix} C_0 & C_1 & \ldots & C_1 & C_1 \\ C_1 & C_0 & \ldots & C_1 & C_1 \\ \ldots & \ldots & \ddots & \ldots & \ldots \\ C_1 & C_1 & \ldots & C_1 & C_0 \end{pmatrix}$$

be the block circulant matrix.

Then $[C]_{np}$ is Jacket matrix if and only if $$C_0 C_1^{RT} + C_1 C_0^{RT} = -(n-2)p[I]_p. \quad (27)$$

Proof. Let $$P = \begin{pmatrix} 0 & 1 & 0 & \ldots & 0 \\ 0 & 0 & 1 & \ldots & 0 \\ \ldots & \ldots & \ldots & \ldots & \ldots \\ 1 & 0 & 0 & \ldots & 0 \end{pmatrix}$$

be the permutation matrix of order n. can be rewritten as $$[C]_{np} = [I]_n \otimes C_0 + P \otimes C_1 + P^2 \otimes C_1 + \ldots + P^{n-1} \otimes C_1.$$

Hence $$[C]_{np}^{RT} = [I]_n \otimes C_0 + P \otimes C_n^{RT} + P^2 \otimes C_1^{RT} + \ldots + P^{n-1} \otimes C_1^{RT}.$$

$$[C]_{np}[C]_{np}^{RT} = ([I]_n \otimes C_1 + P^2 \otimes C_1 + \ldots + P^{n-1} \otimes C_1) \cdot ([I]_n \otimes C_0 + P \otimes C_1^{RT} + P^2 \otimes C_1^{RT} + \ldots + P^{n-1} \otimes C_1^{RT}) = [I]_n \otimes (np[I]_p) + P \otimes (C_0 C_1^{RT} + C_1 C_0^{RT} + (n-2)p[I]_p) + P^2 \otimes (C_0 C_1^{RT} + C_1 C_0^{RT} + (n-2)p[I]_p) + \ldots + P^{n-1} \otimes (C_0 C_1^{RT} + C_1 C_0^{RT} + (n-2)p[I]_p)$$

Hence $[C]_{np}$ is Jacket matrix if and only if $$C_0 C_1^{RT} + C_1 C_0^{RT} = -(n-2)p[I]_p.$$

Now let $$C_0 = \begin{pmatrix} a & b \\ a & -b \end{pmatrix}$$

and $$C_1 = \begin{pmatrix} a & a \\ b & -b \end{pmatrix}$$

be two Jacket matrices for any nonzero complex numbers a,b.

Then $$C_0 C_1^{RT} + C_1 C_0^{RT} == \begin{pmatrix} 2 + \frac{a}{b} + \frac{b}{a} & 0 \\ 0 & 2 + \frac{a}{b} + \frac{b}{a} \end{pmatrix}.$$

Hence $C_0 C_1^{RT} + C_1 C_0^{RT} = -2(n-2)[I]_2$ if and only if $$2 + \frac{a}{b} + \frac{b}{a} = -2(n-2),$$

which implies that $$\frac{b}{a} = \frac{-(n-1) + \sqrt{n^2 - 2n}}{2} := c.$$

In this way, we have got a class of block circulant Jacket matrix of order 2n $$[C]_{np} = \begin{pmatrix} C_0 & C_1 & \ldots & C_1 & C_1 \\ C_1 & C_0 & \ldots & C_1 & C_1 \\ \ldots & \ldots & \ddots & \ldots & \ldots \\ C_1 & C_1 & \ldots & C_1 & C_0 \end{pmatrix},$$

with $$C_0 = \begin{pmatrix} a & ac \\ a & -ac \end{pmatrix} \text{ and } C_1 = \begin{pmatrix} a & a \\ ac & -ac \end{pmatrix}$$

with for all nonzero complex a.

Definition 3.4 Let $$[C]_{np} = \begin{pmatrix} C_0 & C_1 & C_2 & C_2 & \ldots & C_2 & C_2 \\ C_2 & C_0 & C_1 & C_2 & \ldots & C_2 & C_2 \\ \ldots & \ldots & \ldots & \ldots & \ddots & \ldots & \ldots \\ C_1 & C_2 & C_2 & C_2 & \ldots & C_2 & C_0 \end{pmatrix}$$

be the block circulant matrix, where $C_0, C_1, C_2$ are p×p Jacket matrices. Then $[C]_{np}$ is block Jacket matrix if and only if the following conditions hold.

$$C_0 C_2^{RT} C_1 C_0^{RT} + C_2 C_1^{RT} + C_2 C_2^{RT} = -p(n-4)[I]_p, \quad (28)$$

$$C_0 C_2^{RT} C_1 C_2^{RT} + C_2 C_0^{RT} + C_2 C_1^{RT} = -p(n-4)[I]_p, \quad (29)$$

$$C_0 C_1^{RT} C_1 C_2^{RT} + C_2 C_0^{RT} + C_2 C_2^{RT} = -p(n-4)[I]_p, \quad (30)$$

Proof. Let $$P = \begin{pmatrix} 0 & 1 & 0 & \ldots & 0 \\ 0 & 0 & 1 & \ldots & 0 \\ \ldots & \ldots & \ldots & \ldots & \ldots \\ 1 & 0 & 0 & \ldots & 0 \end{pmatrix}$$

be the permutation matrix of order n.

Then $[C]_{np}=[I]_n \otimes C_0 + P \otimes C_1 + P^2 \otimes C_2 + \ldots + P^{n-1} \otimes C_2$. Hence $$[C]_{np}{}^{RT} = [I]_n \otimes C_0 + P \otimes C_2{}^{RT} + P^2 \otimes C_2{}^{RT} + \ldots + P^2 \otimes C_2{}^{RT} + P^{n-1} \otimes C_1{}^{RT}.$$

Hence $[C]_{np}[C]_{np}{}^{RT}=np[I]_{np}$ if and only if $$C_0C_2{}^{RT}+C_1C_0{}^{RT}+C_2C_1{}^{RT}+C_2C_2{}^{RT}=-p(n-4)[I]_p,$$

$$C_0C_2{}^{RT}+C_1C_2{}^{RT}+C_2C_0{}^{RT}+C_2C_1{}^{RT}=-p(n-4)[I]_p,$$

$$C_0C_1{}^{RT}+C_1C_2{}^{RT}+C_2C_0{}^{RT}+C_2C_2{}^{RT}=-p(n-4)[I]_p.$$

Therefore the assertion hold.
Definition 3.5: Let $$[C]_{np} = \begin{pmatrix} C_0 & C_1 & C_2 & C_2 & \ldots & C_2 & C_2 \\ C_2 & C_0 & C_1 & C_2 & \ldots & C_2 & C_2 \\ \ldots & \ldots & \ldots & \ldots & \ddots & \ldots & \ldots \\ C_1 & C_2 & C_2 & C_2 & \ldots & C_2 & C_0 \end{pmatrix}$$

be the block circulant Jacket matrix.
If $C_0, C_1, C_2$ are p×p Jacket matrices, then $(C_1-C_2)(C_0{}^{RT}-C_2{}^{RT})=[0]_p$ and $(C_0-C_2)(C_1{}^{RT}-C_2{}^{RT})=[0]_p$.
Proof. By subtracting equation (29) from (28), we have $$C_1C_2{}^{RT}+C_2C_2{}^{R}-C_1C_2{}^{RT}-C_2C_0{}^{RT}=0.$$

Hence $C_1(C_0{}^{RT}-C_2{}^{RT})-C_2(C_0{}^{RT}-C_2{}^{RT})=0$, which implies $$(C_1-C_2)(C_0{}^{RT}-C_2{}^{RT})=[0]_p.$$

Moreover, subtracting equation (30) from (29), we have $$C_0C_2{}^{RT}+C_2C_1{}^{RT}-C_0C_1{}^{RT}-C_2C_2{}^{RT}=0.$$

Hence $C_0(C_1{}^{RT}-C_2{}^{RT})-C_2(C_1{}^{RT}-C_2{}^{RT})=0$, which implies $$(C_0-C_2)(C_1{}^{RT}-C_2{}^{RT})=[0]_p.$$

Therefore the assertion holds.
For example, let $$C_0 = \begin{pmatrix} a & a \\ aq & aq \end{pmatrix}, C_1 = \begin{pmatrix} a+1 & a+1 \\ (a+1)q & -(a+1)q \end{pmatrix} \text{ and }$$

$$C_2 = \begin{pmatrix} a+1 & a+1 \\ aq & -aq \end{pmatrix}.$$

Then $C_0, C_1$ and $C_2$ are Jacket matrices of order 2. Further $$C_0C_2^{RT} + C_1C_0^{RT} + C_2C_1^{RT} + C_2C_2^{RT} =$$

$$\begin{pmatrix} 2\left(\frac{a+1}{a} + \frac{a}{a+1}\right) + 4 & 0 \\ 0 & 2\left(\frac{a+1}{a} + \frac{a}{a+1}\right) + 4 \end{pmatrix}$$

$$C_0C_2^{RT} + C_1C_2^{RT} + C_2C_0^{RT} + C_2C_1^{RT} =$$

$$\begin{pmatrix} 2\left(\frac{a+1}{a} + \frac{a}{a+1} + 2\right) & 0 \\ 0 & 2\left(\frac{a+1}{a} + \frac{a}{a+1}\right) + 4 \end{pmatrix}, \text{ and}$$

$$C_0C_1^{RT} + C_1C_2^{RT} + C_2C_0^{RT} + C_2C_2^{RT} =$$

$$\begin{pmatrix} 2\left(\frac{a+1}{a} + \frac{a}{a+1}\right) + 4 & 0 \\ 0 & 2\left(\frac{a+1}{a} + \frac{a}{a+1}\right) + 4 \end{pmatrix}.$$

When $$2\left(\frac{a+1}{a} + \frac{a}{a+1}\right) + 4 = -2(n-4),$$

$[C]_{np}$ is a block circulant Jacket matrix.
Example 4, Let $$[C]_{8p} = \begin{pmatrix} C_0 & C_1 & C_2 & C_3 & \ldots & C_6 & C_7 \\ C_7 & C_0 & C_1 & C_2 & \ldots & C_5 & C_6 \\ \ldots & \ldots & \ldots & \ldots & \ddots & \ldots & \ldots \\ C_1 & C_2 & C_3 & C_4 & \ldots & C_7 & C_0 \end{pmatrix}$$

be block circulant matrix. If $C_0$ and $C_1$ are p×p Jacket matrices. Moreover, if $C_2=C_3=C_1$, $C_4=C_0$, $C_5=-C_1$, $C_6=C_1$, $C_7=-C_1$, then $[C]_{8p}$ is a block circulant Jacket matrix.
Example 5, Let $$[C]_{8p} = \begin{pmatrix} C_0 & C_1 & C_2 & C_3 & \ldots & C_6 & C_7 \\ C_7 & C_0 & C_1 & C_2 & \ldots & C_5 & C_6 \\ \ldots & \ldots & \ldots & \ldots & \ddots & \ldots & \ldots \\ C_1 & C_2 & C_3 & C_4 & \ldots & C_7 & C_0 \end{pmatrix}$$

be block circulant matrix. If $C_0$ and $C_1$ are p×p Jacket matrices. Moreover, if $C_2=C_3=C_0$, $C_4=-C_0$, $C_5=C_1$, $C_6=-C_0$, $C_7=C_0$, then $[C]_{8p}$ is a block circulant Jacket matrix.

Eigenvalues of Block Circulant Jacket Matrices

A. Eigenvalues of Block Circulant Jacket Matrices

Hereinafter, explanation will be made on eigenvalues of block circulant Jacket matrices.
Theorem 4.1. Let $$[C]_{np} = \begin{pmatrix} C_0 & C_1 & C_2 & C_3 & \ldots & C_{n-2} & C_{n-1} \\ C_{n-1} & C_0 & C_1 & C_2 & \ldots & C_{n-3} & C_{n-2} \\ \ldots & \ldots & \ldots & \ldots & \ddots & \ldots & \ldots \\ C_1 & C_2 & C_3 & C_4 & \ldots & C_{n-1} & C_0 \end{pmatrix}$$

be the block circulant Jacket matrix.
If $C_0, \ldots, C_{n-1}$ have p common linearly independent eigenvectors, i.e., there exist p nonzero vectors $\xi_1, \ldots, \xi_n$ such that $C_j\xi_k=\lambda_k^{(j)}\xi_k$ for $j=0, \ldots, n-1$, $k=1, \ldots, p$, then the all eigenvalues of $[C]_{np}$ are $\lambda_k^{(0)}+\omega^j\lambda_k^{(1)}+\ldots+\omega^{(n-1)j}\lambda_k^{(n-1)}$ and corresponding eigenvector $\eta_j \otimes \xi_k$, for k=1, ..., p, j=0, 1, ..., n−1, where $$\omega = e^{-\frac{2\pi}{n}i}$$

and $\eta_j = (\omega^0, \omega^j, \ldots, \omega^{(n-1)j})$

Proof. Let $$P = \begin{pmatrix} 0 & 1 & 0 & \ldots & 0 \\ 0 & 0 & 1 & \ldots & 0 \\ \ldots & \ldots & \ldots & \ldots & \ldots \\ 1 & 0 & 0 & \ldots & 0 \end{pmatrix}$$

be the permutation matrix of order n.

It is easy to see that all eigenvalues are $\omega^0, \omega, \ldots, \omega^{n-1}$ corresponding eigenvectors $\eta_0 = (\omega^0, \omega^0, \ldots, \omega^0)^T$, $\eta_1 = (\omega^0, \omega^1, \ldots, \omega^{n-1})^T$, ..., $\eta_j = (\omega^0, \omega^j, \ldots, \omega^{(n-1)j}), \ldots, \eta_{n-1} = (\omega^0, \omega^{1(n-1)}, \ldots, \omega^{(n-1)(n-1)})^T$.

So $P\eta_j = \omega^j \eta_j$. Further $[C]_{np}$ can be rewritten as $[C]_{np} = [I]_n \otimes C_0 + P \otimes C_1 + P^2 \otimes C_2 + \ldots + P^{n-1} \otimes C_2$. Note that $(P^r \otimes C_r)(\eta_j \otimes \xi_k) = (P^r \eta_j) \otimes (C_r \xi_k) = (\omega^{jr} \eta_j) \otimes (\lambda_k^{(r)} \xi_k) = (\omega^{jr} \lambda_k^{(r)})(\eta_j \otimes \xi_k)$.

Hence $$[C]_{np}(\eta_j \otimes \xi_k) = \left(\sum_{r=0}^{n-1} P^r \otimes C_r\right)(\eta_j \otimes \xi_k) = \qquad (31)$$

$$\sum_{r=0}^{n-1} (P^r \otimes C_r)(\eta_j \otimes \xi_k) = \sum_{r=0}^{n-1} (\omega^{jr} \lambda_k^{(r)})(\eta_j \otimes \xi_k).$$

So $\sum_{r=0}^{n-1} \omega^{jr} \lambda_k^{(r)}$ is an eigenvalue of $[C]_{np}$ and corresponding eigenvector $(\eta_j \otimes \xi_k)$, for j=0, ..., n−1, k=1, ..., p.

For example, let $$C_0 = \begin{pmatrix} 1 & \omega & \omega \\ \omega & 1 & \omega \\ \omega & \omega & 1 \end{pmatrix} \text{ and } C_1 = iC_0 = \begin{pmatrix} i & i\omega & i\omega \\ i\omega & i & i\omega \\ i\omega & i\omega & i \end{pmatrix}.$$

where $\omega_3 = 1$, $I^2 = -1$. It is easy to see that $C_0$ have three eigenvalues $\lambda_1^{(0)} = 2+\omega$, $\lambda_2^{(0)} = 2+\omega^2$, $\lambda_3^{(0)} = 2+\omega^2$ corresponding eigenvectors, $$\xi_1 = \frac{1}{\sqrt{3}}(1, 1, 1)^T,$$

$$\xi_2 = \frac{1}{\sqrt{3}}(1, \omega, \omega^2)^T, \xi_3 = \frac{1}{\sqrt{3}}(1, \omega^2, \omega^4)^T.$$

Then $C_1 = iC^0$ has three eigenvalues $\lambda_1^{(1)} = i(2+\omega)$, $\lambda_1^{(2)} = i(2+\omega^2)$, $\lambda_3^{(1)} = i(2+\omega^2)$ corresponding eigenvectors, $$\xi_1 = \frac{1}{\sqrt{3}}(1, 1, 1)^T, \xi_2 = \frac{1}{\sqrt{3}}(1, \omega, \omega^2)^T, \xi_3 = \frac{1}{\sqrt{3}}(1, \omega^2, \omega^4)^T.$$

Then by Theorem 4.1, the block circulant Jacket matrix $$[C]_4 = \begin{pmatrix} C_0 & C_1 \\ C_1 & C_0 \end{pmatrix}$$

has eigenvalues $$\lambda_1^{(0)} + \lambda_1^{(1)} = (2+\omega) + i(2+\omega) = (1+i)(2+\omega),$$

$$\lambda_2^{(0)} + \lambda_2^{(1)} = (2+\omega^2) + i(2+\omega^2) = (1+i)(2+\omega^2),$$

$$\lambda_3^{(0)} + \lambda_3^{(1)} = (2+\omega^2) + i(2+\omega^2) = (1+i)(2+\omega^2),$$

$$\lambda_1^{(0)} + \omega\lambda_1^{(1)} = (1+i\omega)(2+\omega), \lambda_2^{(0)} + \omega\lambda_2^{(1)} = (1+i\omega)(2+\omega^2), \lambda_3^{(0)} + \omega\lambda_3^{(1)} = (1+i\omega)(2+\omega^2)$$

and corresponding eigenvectors $\eta_0 \otimes \xi_1$, $\eta_0 \otimes \xi_2$, $\eta_0 \otimes \xi_3$, $\eta_1 \otimes \xi_2$, $\eta_1 \otimes \xi_3$, where $$\eta_0 = \frac{1}{\sqrt{2}}(1, 1)^T, \eta_1 = \frac{1}{\sqrt{2}}(1, -1)^T.$$

$$[C]_8 = \begin{pmatrix} C_0 & C_1 & C_2 & C_3 \\ C_3 & C_0 & C_1 & C_2 \\ C_2 & C_3 & C_0 & C_1 \\ C_1 & C_2 & C_3 & C_0 \end{pmatrix} = \qquad (32)$$

$$\frac{1}{2\sqrt{2}} \begin{pmatrix} 1 & 1 & 1 & 1 & 1 & 1 & 1 & 1 \\ 1 & -1 & 1 & -1 & 1 & -1 & 1 & -1 \\ 1 & 1 & \omega & \omega & \omega^2 & \omega^2 & \omega^3 & \omega^3 \\ 1 & -1 & \omega & -\omega & \omega^2 & -\omega^2 & \omega^3 & -\omega^3 \\ 1 & 1 & \omega^2 & \omega^2 & \omega^4 & \omega^4 & \omega^6 & \omega^6 \\ 1 & -1 & \omega^2 & -\omega^2 & \omega^4 & -\omega^4 & \omega^6 & -\omega^6 \\ 1 & 1 & \omega^3 & \omega^3 & \omega^6 & \omega^6 & \omega^9 & \omega^9 \\ 1 & -1 & \omega^3 & -\omega^3 & \omega^6 & -\omega^6 & \omega^9 & -\omega^9 \end{pmatrix} \times$$

$$\begin{pmatrix} 1+i & 0 & 0 & 0 & 0 & 0 & 0 & 0 \\ 0 & 1-i & 0 & 0 & 0 & 0 & 0 & 0 \\ 0 & 0 & 2-2i & 0 & 0 & 0 & 0 & 0 \\ 0 & 0 & 0 & 2+2i & 0 & 0 & 0 & 0 \\ 0 & 0 & 0 & 0 & 1+i & 0 & 0 & 0 \\ 0 & 0 & 0 & 0 & 0 & 1-i & 0 & 0 \\ 0 & 0 & 0 & 0 & 0 & 0 & -2+2i & 0 \\ 0 & 0 & 0 & 0 & 0 & 0 & 0 & -2-2i \end{pmatrix} \times$$

$$\frac{1}{2\sqrt{2}}\begin{pmatrix} 1 & 1 & 1 & 1 & 1 & 1 & 1 & 1 \\ 1 & -1 & 1 & -1 & 1 & -1 & 1 & -1 \\ 1 & 1 & \omega & \omega & \omega^2 & \omega^2 & \omega^3 & \omega^3 \\ 1 & -1 & \omega & -\omega & \omega^2 & -\omega^2 & \omega^3 & -\omega^3 \\ 1 & 1 & \omega^2 & \omega^2 & \omega^4 & \omega^4 & \omega^6 & \omega^6 \\ 1 & -1 & \omega^2 & -\omega^2 & \omega^4 & -\omega^4 & \omega^6 & -\omega^6 \\ 1 & 1 & \omega^3 & \omega^3 & \omega^6 & \omega^6 & \omega^9 & \omega^9 \\ 1 & -1 & \omega^3 & -\omega^3 & \omega^6 & -\omega^6 & \omega^9 & -\omega^9 \end{pmatrix}^*.$$

B. Block Circulant DFT Jacket Matrices

Hereinafter, explanation will be made on an efficient algorithm for a fast computation of the block circulant Jacket matrices. In order to present an algorithm, assume that there exist p nonzero unit orthogonal eigenvectors $\xi_1, \ldots, \xi_n$ such that $C_j \xi_k = \lambda_k^{(j)} \xi_k$ for $j=0, \ldots, n-1, k=1, \ldots, p$.

Let $\phi_{jk} = \lambda_k^{(0)} + \omega^j \lambda_k^{(1)} + \ldots + \omega^{(n-1)j} \lambda_k^{(n-1)}$.

Then the eigenvalues of np×np block circulant Jacket matrix $$[C]_{np} = \begin{pmatrix} C_0 & C_1 & C_2 & C_3 & \ldots & C_{n-2} & C_{n-1} \\ C_{n-1} & C_0 & C_1 & C_2 & \ldots & C_{n-3} & C_{n-2} \\ \ldots & \ldots & \ldots & \ldots & \ddots & \ldots & \ldots \\ C_1 & C_2 & C_3 & C_4 & \ldots & C_{n-1} & C_0 \end{pmatrix}$$

are $\phi_{01}, \ldots, \phi_{0p}, \phi_{11}, \ldots, \phi_{n-1,1}, \ldots, \phi_{n-1,p}$ and the corresponding eigenvectors, also we have $\eta_0 \otimes \xi_1, \ldots, \eta_0 \otimes \xi_p, \eta_1 \otimes \xi_1, \ldots, \eta_1 \otimes \xi_p, \ldots, \eta_{n-1} \otimes \xi_1, \ldots, \eta_{n-1} \otimes \xi_p$.

Moreover, let $[U]_p := (\xi_1, \ldots, \xi_p)$ be a p×p unitary matrix. Then block circulant Jacket matrix $[C]_{np}$ can be factored to $$[C]_{np} = ([V]_n \otimes U_p) \mathrm{diag}(\phi_{0,1}, \ldots, \phi_{0,p}, \phi_{2,1}, \ldots, \phi_{2,p}, \ldots, \phi_{n-1,1}, \ldots, \phi_{n-1,p})([V]_n \otimes [U]_p)^H,$$

where H is Hermitian transpose. If $C_0, \ldots, C_{n-1}$ are circulant Jacket matrices, then we can choose that $$[U]_p := (\xi_1, \ldots, \xi_p) = \begin{pmatrix} u_{11} & u_{12} & \ldots & u_{1p} \\ u_{21} & u_{22} & \ldots & u_{2p} \\ \ldots & \ldots & \ddots & \ldots \\ u_{p1} & u_{p2} & \ldots & u_{pp} \end{pmatrix},$$

where $$u_{k,j} = e^{\frac{((k-1)(j-1))}{2\pi}i},$$

$k,j=1, \ldots, p, I^2=-1$. Since DFT has a fast algorithm, two Kronecker product of DFTs has fast algorithm.

For example, let $$C_0 = \begin{pmatrix} 1 & i \\ i & 1 \end{pmatrix}, C_1 = \begin{pmatrix} 2 & -2i \\ -2i & 2 \end{pmatrix}, C_2 = \begin{pmatrix} 1 & i \\ i & 1 \end{pmatrix}, C_3 = \begin{pmatrix} -2 & 2i \\ 2i & -2 \end{pmatrix}.$$

Then $C_0$ has eigenvalues $\lambda_1^{(0)}=1+i$ and $\lambda_2^{(0)}=1-i$ corresponding eigenvectors $$\xi_1 = \frac{1}{\sqrt{2}}(1,1)^T, \xi_1 = \frac{1}{\sqrt{2}}(1,-1)^T,$$

respectively. $C_1$ has $\lambda_1^{(1)}=2-2i$ and $\lambda_2^{(1)}=2+2i$ corresponding eigenvectors $$\xi_1 = \frac{1}{\sqrt{2}}(1,1)^T, \xi_1 = \frac{1}{\sqrt{2}}(1,-1)^T,$$

respectively. Then $C_2$ has eigenvalues $\lambda_1^{(2)}=1+i$ and $\lambda_2^{(2)}=1-i$ corresponding eigenvectors $$\xi_1 = \frac{1}{\sqrt{2}}(1,1)^T, \xi_1 = \frac{1}{\sqrt{2}}(1,-1)^T,$$

respectively. $C_3$ has $\lambda_1^{(3)}=-2+2i$ and $\lambda_2^{(3)}=-2-2i$ corresponding eigenvectors $$\xi_1 = \frac{1}{\sqrt{2}}(1,1)^T, \xi_1 = \frac{1}{\sqrt{2}}(1,-1)^T,$$

respectively.

$$[V]_4 = (\eta_0, \eta_1, \eta_2, \eta_3) = \frac{1}{2}\begin{pmatrix} V_{11} & V_{12} & V_{13} & V_{14} \\ V_{21} & V_{22} & V_{23} & V_{24} \\ V_{31} & V_{32} & V_{33} & V_{34} \\ V_{41} & V_{42} & V_{43} & V_{44} \end{pmatrix} = \begin{pmatrix} 1 & 1 & 1 & 1 \\ 1 & \omega & \omega^2 & \omega^3 \\ 1 & \omega^2 & \omega^4 & \omega^6 \\ 1 & \omega^3 & \omega^6 & \omega^9 \end{pmatrix},$$

$\omega^4 = 1$, $$\eta_0 \otimes \xi_1 = \frac{1}{2\sqrt{2}}(1,1,1,1,1,1,1,1)^T$$

$$\eta_0 \otimes \xi_2 = \frac{1}{2\sqrt{2}}(1,-1,1,-1,1,-1,1,-1)^T$$

$$\eta_1 \otimes \xi_1 = \frac{1}{2\sqrt{2}}(1,1,\omega,\omega,\omega^2,\omega^2,\omega^3,\omega^3)^T$$

$$\eta_1 \otimes \xi_2 = \frac{1}{2\sqrt{2}}(1,-1,\omega,-\omega,\omega^2,-\omega^2,\omega^3,-\omega^3)^T$$

$$\eta_2 \otimes \xi_1 = \frac{1}{2\sqrt{2}}(1,1,\omega^2,\omega^2,\omega^4,\omega^4,\omega^6,\omega^6)^T$$

$$\eta_2 \otimes \xi_2 = \frac{1}{2\sqrt{2}}(1,-1,\omega^2,-\omega^2,\omega^4,-\omega^4,\omega^6,-\omega^6)^T$$

$$\eta_3 \otimes \xi_1 = \frac{1}{2\sqrt{2}}(1,1,\omega^3,\omega^3,\omega^6,\omega^6,\omega^9,\omega^9)^T,$$

$$\eta_3 \otimes \xi_2 = \frac{1}{2\sqrt{2}}(1,-1,\omega^3,-\omega^3,\omega^6,-\omega^6,\omega^9,-\omega^9)^T.$$

The fast block circulant Jacket transform.

The Hadamard transform, Y, of a $2^n \times 1$ vector X is defined as $$Y = H_n X, \qquad (33)$$

straightforward calculation of (33) requires $O(2^{2n})$ arithmetic operation. There are fast methods just as there are fast methods for calculate similar transforms such as the Fourier transform. On the while, the fast BCJT is the similar fashion as fast Hadamard transform, $[C]_{np}=[I]_n \otimes C_0+P \otimes C_1+P^2 \otimes C_1+\ldots+P^{n-1} \otimes C_1,$
$H_N=(H_2 \otimes I_{N/2})(I_2 \otimes H_{N/2})$ Let $C_0$ and $C_1$ be two p×p Jacket matrices.
Let $$[C]_{np} = \begin{pmatrix} C_0 & C_1 & \ldots & C_1 & C_1 \\ C_1 & C_0 & \ldots & C_1 & C_1 \\ \ldots & \ldots & \ddots & \ldots & \ldots \\ C_1 & C_1 & \ldots & C_1 & C_0 \end{pmatrix}$$

be a block circulant Jacket matrix.

Further $[C]_{np}$ can be rewritten as $[C]_{np}=[I]_n \otimes C_0+P \otimes C_1+P^2 \otimes C_1+\ldots+P^{n-1} \otimes C_1.$ As an example, N=8 case, $[C]_8=[I]_4 \otimes C_0+P \otimes C_0+P^2 \otimes C_0+P^3 \otimes C_1,$ $$P = \begin{pmatrix} 0 & 1 & 0 & 0 \\ 0 & 0 & 1 & 0 \\ 0 & 0 & 0 & 1 \\ 1 & 0 & 0 & 0 \end{pmatrix}$$

is the permutation matrix.
Then, we have $$[C]_8 = ([H]_2 \otimes [I]_4) \begin{bmatrix} I_2 \otimes I_2 & I_2 \otimes I_2 \\ \hat{P}_2 \otimes I_2 & \overline{P}_2 \otimes I_2 \end{bmatrix}(I_4 \otimes H_2), \text{ where} \quad (34)$$

$$\hat{P}_2 = \begin{bmatrix} 0 & 1 \\ -1 & 0 \end{bmatrix}, \overline{P}_2 = \begin{bmatrix} 0 & -1 \\ 1 & 0 \end{bmatrix}.$$

Therefore, $$[C]_8 = \begin{bmatrix} 1 & 1 & 1 & 1 & 1 & 1 & -1 & -1 \\ 1 & -1 & 1 & -1 & 1 & -1 & -1 & 1 \\ -1 & -1 & 1 & 1 & 1 & 1 & 1 & 1 \\ -1 & 1 & 1 & -1 & 1 & -1 & 1 & -1 \\ 1 & 1 & -1 & -1 & 1 & 1 & 1 & 1 \\ 1 & -1 & -1 & 1 & 1 & -1 & 1 & -1 \\ 1 & 1 & 1 & 1 & -1 & -1 & 1 & 1 \\ 1 & -1 & 1 & -1 & -1 & 1 & 1 & -1 \end{bmatrix} = \quad (35)$$

$$\begin{bmatrix} 1 & 0 & 0 & 0 & 1 & 0 & 0 & 0 \\ 0 & 1 & 0 & 0 & 0 & 1 & 0 & 0 \\ 0 & 0 & 1 & 0 & 0 & 0 & 1 & 0 \\ 0 & 0 & 0 & 1 & 0 & 0 & 0 & 1 \\ 1 & 0 & 0 & 0 & -1 & 0 & 0 & 0 \\ 0 & 1 & 0 & 0 & 0 & -1 & 0 & 0 \\ 0 & 0 & 1 & 0 & 0 & 0 & -1 & 0 \\ 0 & 0 & 0 & 1 & 0 & 0 & 0 & -1 \end{bmatrix} \begin{bmatrix} 1 & 0 & 0 & 0 & 1 & 0 & 0 & 0 \\ 0 & 1 & 0 & 0 & 0 & 1 & 0 & 0 \\ 0 & 0 & 1 & 0 & 0 & 0 & 1 & 0 \\ 0 & 0 & 0 & 1 & 0 & 0 & 0 & 1 \\ 0 & 0 & 1 & 0 & 0 & 0 & -1 & 0 \\ 0 & 0 & 0 & 1 & 0 & 0 & 0 & -1 \\ -1 & 0 & 0 & 0 & 1 & 0 & 0 & 0 \\ 0 & -1 & 0 & 0 & 0 & 1 & 0 & 0 \end{bmatrix}$$

$$\begin{bmatrix} 1 & 1 & 0 & 0 & 0 & 0 & 0 & 0 \\ 1 & -1 & 0 & 0 & 0 & 0 & 0 & 0 \\ 0 & 0 & 1 & 1 & 0 & 0 & 0 & 0 \\ 0 & 0 & 1 & -1 & 0 & 0 & 0 & 0 \\ 0 & 0 & 0 & 0 & 1 & 1 & 0 & 0 \\ 0 & 0 & 0 & 0 & 1 & -1 & 0 & 0 \\ 0 & 0 & 0 & 0 & 0 & 0 & 1 & 1 \\ 0 & 0 & 0 & 0 & 0 & 0 & 1 & -1 \end{bmatrix}.$$

Also, for the inverse transform, we have $$[C]_8^{-1} = \frac{1}{8}\begin{bmatrix} 1 & 1 & -1 & -1 & 1 & 1 & 1 & 1 \\ 1 & -1 & -1 & 1 & 1 & -1 & 1 & -1 \\ 1 & 1 & 1 & 1 & -1 & -1 & 1 & 1 \\ 1 & -1 & 1 & -1 & -1 & 1 & 1 & -1 \\ 1 & 1 & 1 & 1 & 1 & 1 & -1 & -1 \\ 1 & -1 & 1 & -1 & 1 & -1 & -1 & 1 \\ -1 & -1 & 1 & 1 & 1 & 1 & 1 & 1 \\ -1 & 1 & 1 & -1 & 1 & -1 & 1 & -1 \end{bmatrix} = \frac{1}{8} \quad (36)$$

$$\begin{bmatrix} 1 & 1 & 0 & 0 & 0 & 0 & 0 & 0 \\ 0 & -1 & 0 & 0 & 0 & 0 & 0 & 0 \\ 0 & 0 & 1 & 1 & 0 & 0 & 0 & 0 \\ 0 & 0 & 0 & 1 & -1 & 0 & 0 & 0 \\ 0 & 0 & 0 & 0 & 1 & 1 & 0 & 0 \\ 0 & 0 & 0 & 0 & 1 & -1 & 0 & 0 \\ 0 & 0 & 0 & 0 & 0 & 1 & 1 & 0 \\ 0 & 0 & 0 & 0 & 0 & 1 & -1 & 0 \end{bmatrix} \begin{bmatrix} 1 & 0 & 0 & 0 & 0 & 0 & -1 & 0 \\ 0 & 1 & 0 & 0 & 0 & 0 & 0 & -1 \\ 0 & 0 & 1 & 0 & 1 & 0 & 0 & 0 \\ 0 & 0 & 0 & 1 & 0 & 1 & 0 & 0 \\ 1 & 0 & 0 & 0 & 0 & 0 & 1 & 0 \\ 0 & 1 & 0 & 0 & 0 & 0 & 0 & 1 \\ 0 & 0 & 1 & 0 & -1 & 0 & 0 & 0 \\ 0 & 0 & 0 & 1 & 0 & -1 & 0 & 0 \end{bmatrix}$$

$$\begin{bmatrix} 1 & 0 & 0 & 0 & 1 & 0 & 0 & 0 \\ 0 & 1 & 0 & 0 & 0 & 1 & 0 & 0 \\ 0 & 0 & 1 & 0 & 0 & 0 & 1 & 0 \\ 0 & 0 & 0 & 1 & 0 & 0 & 0 & 1 \\ 1 & 0 & 0 & 0 & -1 & 0 & 0 & 0 \\ 0 & 1 & 0 & 0 & 0 & -1 & 0 & 0 \\ 0 & 0 & 1 & 0 & 0 & 0 & -1 & 0 \\ 0 & 0 & 0 & 1 & 0 & 0 & 0 & -1 \end{bmatrix}.$$

Note that, $[C]_8[C]_8^{-1}=[I]_8$.
Then, we can get a general formula, $[C]_N = [I]_4 \otimes C_0 + P \otimes C_0 + \ldots + P^{N/2-2} \otimes C_0 + P^{N/2-1} \otimes C_1,$ (38)

where $N = 2^k, k = 3, 4, \ldots =$ $([H]_2 \otimes [I]_{N/2}) \begin{bmatrix} I_2 \otimes I_{N/4} & I_2 \otimes I_{N/4} \\ \hat{P}_2 \otimes I_{N/4} & \overline{P}_2 \otimes I_{N/4} \end{bmatrix} \ldots (I_{N/2} \otimes H_2).$ The $[C]_N$ general formula (37) is similar fashion as the Hadamard.

$H_N=([H]_2 \otimes [I]_{N/2})(I_{N/2} \otimes H_2)$ [5, eq. (4)].

Figure 3:
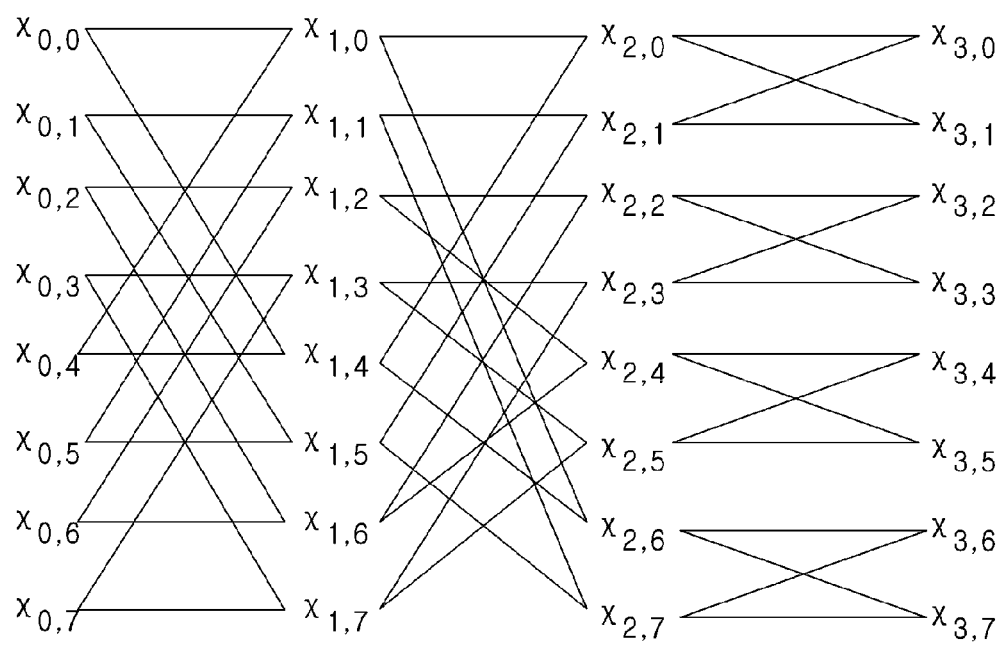
FIG. 3 illustrates a fast orthogonal BCJM transform signal flow graph for a forward, N=8.
Figure 4:
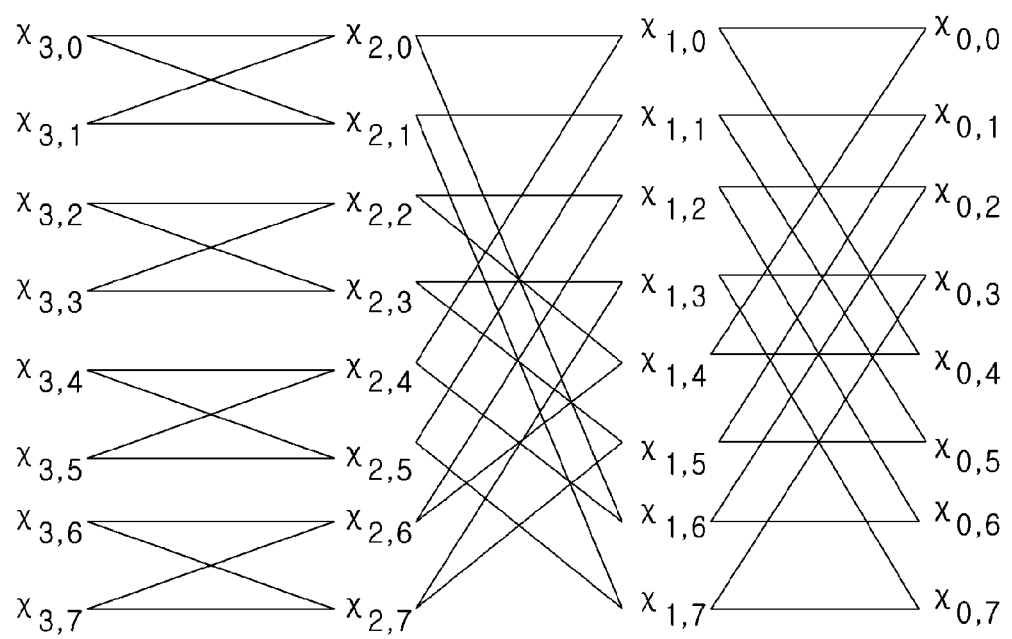
FIG. 4 illustrates a fast orthogonal BCJM transform signal flow graph for an inverse, N=8.

FIGS. 3 and 4 show a fast forward flow graph of BCJM and inverse BCJM transform, then we compute the complexity of this decomposed factor of the proposed transform. Firstly, for the block matrix $C_0$, there needs a multiplications and b additions. We can compare the computation complexity in the fast algorithm and the direct computation.

Since in $C_0(X_0+X_2)+C_1(X_1+X_3)$, there needs 2b+3p additions and 2a multiplications. Then for the order=$4^2p$, there needs 2(2b+3p)+3p additions and 2·2a multiplications. Note that $$2(2b+3p)+3p = 2^2b+3p(2+1) = 2^2b+3p(2^2-1).$$

Hence for $C_{4^kp}$ needs $2^kb+3p(2^k-1)$ additions and $2^ka$ multiplications. However for $C_{np}$, there needs 2b+(p−1)n additions and 2a multiplications. The Table 1 show that the complexity of the present disclosure is better than direct calculation. It reduces about 50% when it applies to the multiplications. In the order of 4p, $$[C]_{4p} = \begin{pmatrix} C_0 & C_1 & C_0 & -C_1 \\ -C_1 & C_0 & C_1 & C_0 \\ C_0 & -C_1 & C_0 & C_1 \\ C_1 & C_0 & -C_1 & C_0 \end{pmatrix}.$$

In this block circulant Jacket matrix, we have $$[C]_{4p}\chi = \begin{pmatrix} C_0 & C_1 & C_0 & -C_1 \\ -C_1 & C_0 & C_1 & C_0 \\ C_0 & -C_1 & C_0 & C_1 \\ C_1 & C_0 & -C_1 & C_0 \end{pmatrix} \begin{pmatrix} \chi_0 \\ \chi_1 \\ \chi_2 \\ \chi_3 \end{pmatrix} = \begin{pmatrix} C_0(\chi_0+\chi_2)+C_1(\chi_1-\chi_3) \\ C_0(\chi_1+\chi_3)+C_1(-\chi_0+\chi_2) \\ C_0(-\chi_0+\chi_2)+C_1(-\chi_1+\chi_3) \\ C_0(\chi_1+\chi_3)+C_1(\chi_0-\chi_2) \end{pmatrix}.$$

It is very clear that we have 2b+3p additions and 2a multiplications in $C_0(X_0+X_2)+C_1(X_1+X_2)$, and same in the others. The architecture of the fast BCJM is shown in FIG. 5. The shift register provides the block circulant matrix units, and fast algorithm products the whole matrix by using proper construction.

Capacity of a Time-Invariant MIMO Gaussian Channel Based the BCJM

Figures 6, 7:
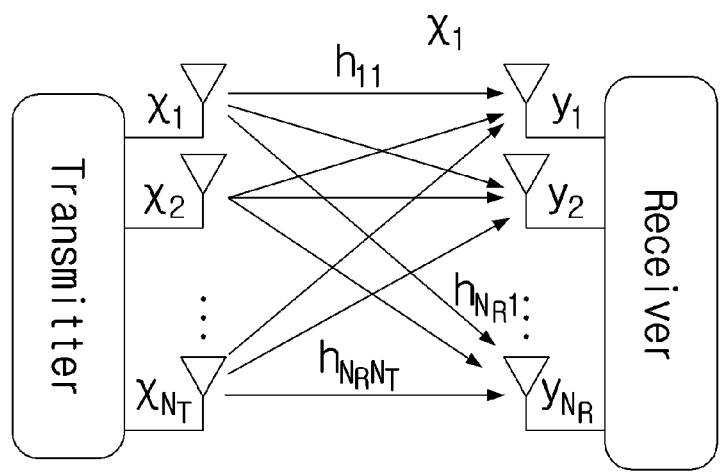
FIG. 6 illustrates a system model of MIMO Gaussian Channel.
FIG. 7 illustrates a table for comparison of BCJM complexity between a conventional method and an embodiment of the present disclosure.

We can apply the BCJM to improve time-invariant Gaussian MIMO channel capacity. For a MIMO system with $N_T$ transmit and $N_R$ receive antennas, as shown in FIG. 6, a narrowband time-invariant wireless channel can be represented by $N_R \times N_T$ deterministic matrix $H \in C^{N_R \times N_T}$. Consider a transmitted symbol vector $x \in C^{N_T \times 1}$, which is composed of $N_T$ independent input symbols $x_1, x_2, \ldots, x_{N_T}$. Then, the received signal $y \in C^{N_R \times 1}$ can be rewritten in a matrix form as follows:

$$y = \sqrt{\frac{E_\chi}{N_T}} H\chi + Z, \quad (39)$$

where $z=(z_1, z_2, \ldots, z_{N_r})^T \in C^{N_R \times 1}$ is a noise vector, which is assumed to be zero-mean circular symmetric complex Gaussian (ZMCSCG). $E_x$ is the energy of the transmitted signals. Note that the noise vector z is referred to as circular symmetric when $e^{j\theta}z$ has the same distribution as z for any θ. The autocorrelation of transmitted signal vector is defined as $$R_{xx} = E[xx^H]. \quad (40)$$

Note that $Tr(R_{xx})=N_T$ the transmission power for each transmit antenna is assumed to be 1.

In general, the MIMO channel gains are not independent and identically distributed (i.i.d.). The channel correlation is closely related to the capacity of the MIMO channel. In the sequel, we consider the capacity of the MIMO channel when the channel gains between transmit and received antennas are correlated. When the SNR is high, the deterministic channel capacity can be approximated as $$C \approx \max_{Tr(R_{\chi\chi})=N} \log_2 \det(R_{\chi\chi}) + \log_2 \det\left(\frac{E_\chi}{NN_0} H_W H_W^H\right) \quad (41)$$

From Equation (41), we can see that the second term is constant, while the first term involving $\det(R_{xx})$ maximized when $R_{xx}=I_N$. Consider the following correlated channel model:

$$H = R_r^{1/2} H_W R_t^{1/2} \quad (42)$$

where $R_t$ is the correlation matrix, reflecting the correlations between the transmit antennas (i.e., the correlations between the column vectors of H), $R_r$ is the correlation matrix reflecting the correlations between the receive antennas (i.e., the correlations between the row vectors of H), and $H_W$ denotes the i.i.d. Rayleigh fading channel gain matrix. The diagonal entries of $R_t$ and $R_r$ are constrained to be a unity. Then, the MIMO channel is given as $$C = \log_2 \det\left(/N_R + \frac{E_\chi}{N_T N_0} R_r^{1/2} H_w R_t H_w^H R_r^{\frac{H}{2}}\right) \quad (43)$$

Simulation computes the ergodic MIMO channel capacity when there exists a correlation between the transmit and receive antennas, with the following channel correlation matrices:

$$R_r = I_4(\text{rank}(R_r=1)).$$

Case 1: Toeplitz channel matrix

We have the $R_t$ is a Toeplitz matrix, an n×n matrix $T_n = [t_{k,j}; k,j=0, 1, \ldots, n-1]$, where $t_{k,j}=t_{k-j}$, i.e., a matrix of the form.

$$R_t = \begin{pmatrix} t_0 & t_{-1} & t_{-2} & \cdots & t_{-(n-1)} \\ t_1 & t_0 & t_{-1} & & \\ t_2 & t_1 & t_0 & & \vdots \\ \vdots & & & \ddots & \\ t_{n-1} & & \cdots & & t_0 \end{pmatrix}. \quad (44)$$

$R_r=I_4$ states that no correlation exists between the receive antennas.

From which it can be shown that a capacity of 3.3 bps/Hz is lost due to the channel correlation when SNR is 18 dB.

Case 2: Block circulant Jacket correlation matrix.

We have the $R_t$ is a Block circulant matrix.

$$R_t = \begin{pmatrix} \begin{pmatrix} 1 & 1 \\ 1 & -1 \end{pmatrix} & \rho\begin{pmatrix} 1 & 1 \\ 1 & -1 \end{pmatrix} \\ \rho\begin{pmatrix} 1 & 1 \\ 1 & -1 \end{pmatrix} & \begin{pmatrix} 1 & 1 \\ 1 & -1 \end{pmatrix} \end{pmatrix}, \text{ where } 0 < \rho < 1. \quad (45)$$

Figure 8:
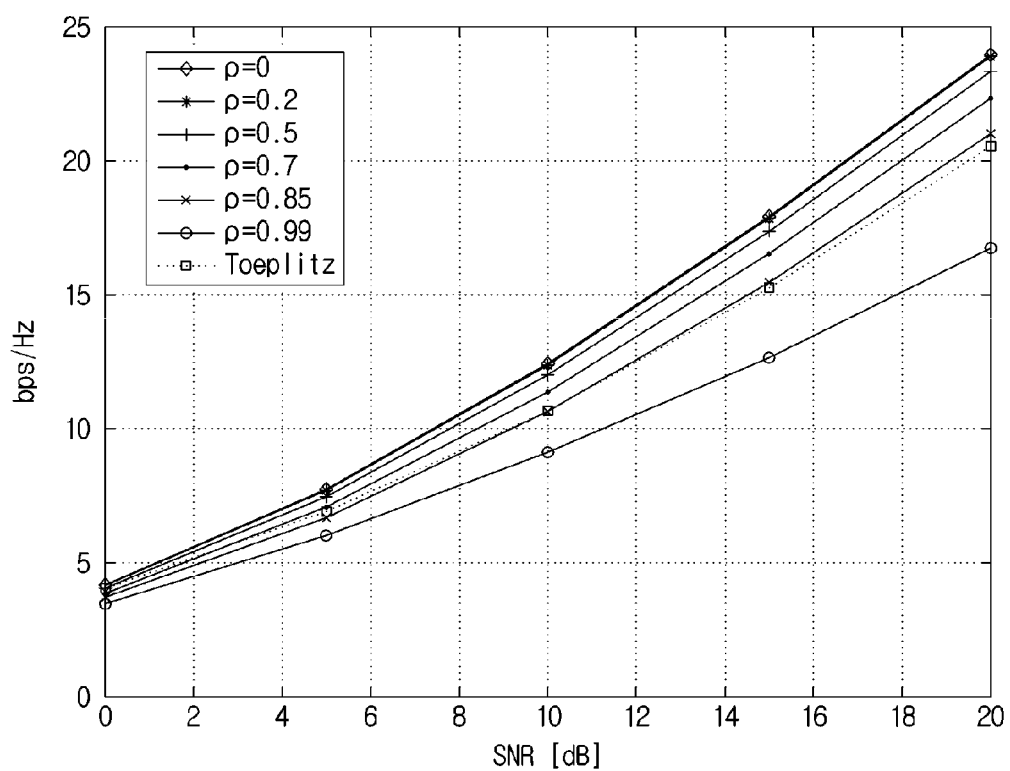
FIG. 8 illustrates a channel capacity versus SNR.
Figure 9:
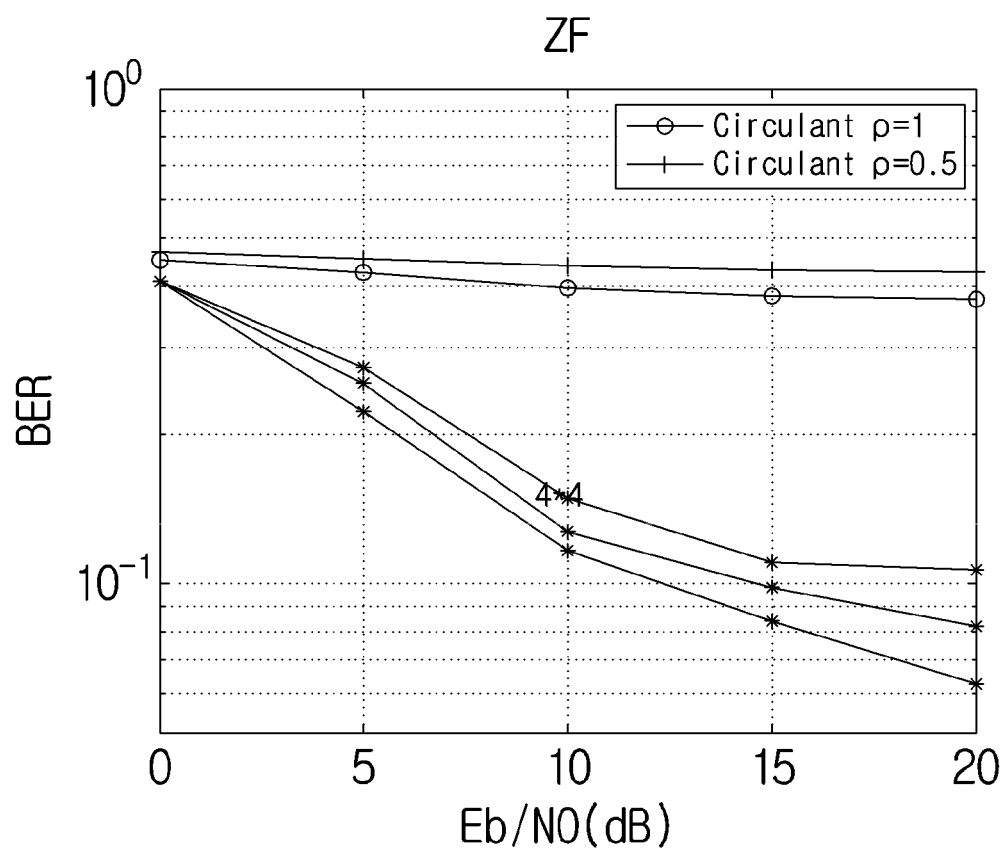
FIG. 9 illustrates a comparison of 4×4 MIMO and Block Diagonal 4×4 MIMO Symbol Error Rate.
Figure 10:
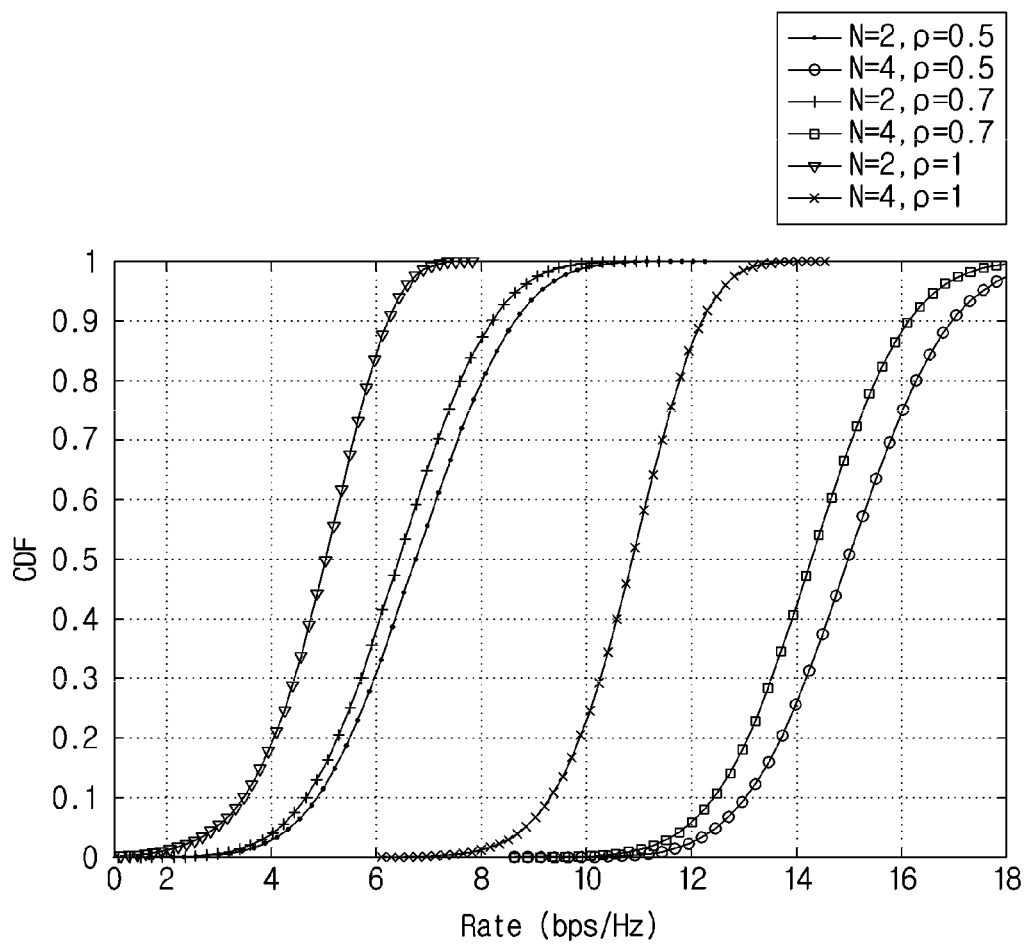
FIG. 10 illustrates CDFs of the correlated 2×2 and 4×4 MIMO channel.

From FIG. 8, we observe that the block circulant Kronecker channel capacity could improve than conventional MIMO as an efficient capacity achieving scheme at high signal-to-noise ratio regime. FIG. 9 shows the average BER performance versus input SNR for comparing the transceiver scheme of the present disclosure with the existing transceiver algorithms. It can be seen that lower correlation coefficients lead to a better performance. FIG. 10 shows the CDFs of the correlated 2×2 and 4×4 MIMO channel capacities, it is clear from figures that the MIMO channel capacity improves with increasing the number of transmit and receive antennas.

Kronecker MIMO 2×2 BCJM Channel

In example 1, and FIG. 1, consider the Kronecker MIMO 2×2 BCJM channel as following, transceiver the power correlation are set to $|\mu|^2, |\rho|^2$:

$$|\mu|^2 = \langle |\alpha_{11}|^2, |\alpha_{21}|^2 \rangle = \langle |\alpha_{12}|^2, |\alpha_{22}|^2 \rangle$$

$$|\rho|^2 = \langle |\alpha_{11}|^2, |\alpha_{21}|^2 \rangle = \langle |\alpha_{12}|^2, |\alpha_{22}|^2 \rangle \quad (46)$$

Taking into account the fact that correlation matrices are, let $C_0$ be Hadamard $H_2$ matrix, the BCJM spatial correlation matrices are defined as follows $$R_{T_x} @ \begin{pmatrix} C_0 & C_0\mu \\ (C_0\mu)^* & C_0 \end{pmatrix} = \begin{pmatrix} H_2 & H_2\mu \\ (H_2\mu)^* & H_2 \end{pmatrix}, \quad (47)$$

$$R_{R_x} @ \begin{pmatrix} H_2 & H_2\rho \\ (H_2\rho)^* & H_2 \end{pmatrix}. \quad (48)$$

Note that $R_{T_x}$ and $R_{R_x}$ and can be replaced by $R_{MS}$ and $R_{BS}$ in up-link or $R_{BS}$ and $R_{MS}$ in down-link, respectively. The Kronecker product MIMO 2×2 BCJM channel matrix as follows $$R_{MIMO} = R_{T_x} \otimes R_{R_x}. \quad (49)$$

The Cholesky decomposition of $\Gamma$ is given by $$\Gamma = R_{MIMO} \times P = \begin{bmatrix} H_2^2 & \rho H_2^2 & \mu H_2^2 & \mu\rho H_2^2 \\ \rho^* H_2^2 & H_2^2 & \mu\rho^* H_2^2 & \mu H_2^2 \\ \mu^* & H_2^2 \mu^* \rho H_2^2 & H_2^2 & \rho H_2^2 \\ \mu^* \rho^* H_2^2 & \mu^* & H_2^2 \rho^* H_2^2 & H_2^2 \end{bmatrix} \times$$

$$\begin{bmatrix} \sigma_{\alpha_{11}}^2 & \sigma_{\alpha_{11}}\sigma_{\alpha_{12}} & \sigma_{\alpha_{11}}\sigma_{\alpha_{21}} & \sigma_{\alpha_{11}}\sigma_{\alpha_{22}} \\ \sigma_{\alpha_{12}}\sigma_{\alpha_{11}} & \sigma_{\alpha_{12}}^2 & \sigma_{\alpha_{12}}\sigma_{\alpha_{21}} & \sigma_{\alpha_{12}}\sigma_{\alpha_{22}} \\ \sigma_{\alpha_{21}}\sigma_{\alpha_{11}} & \sigma_{\alpha_{21}}\sigma_{\alpha_{12}} & \sigma_{\alpha_{21}}^2 & \sigma_{\alpha_{21}}\sigma_{\alpha_{22}} \\ \sigma_{\alpha_{22}}\sigma_{\alpha_{11}} & \sigma_{\alpha_{22}}\sigma_{\alpha_{12}} & \sigma_{\alpha_{22}}\sigma_{\alpha_{21}} & \sigma_{\alpha_{22}}^2 \end{bmatrix} =$$

$$\begin{bmatrix} H_2^2 \sigma_{\alpha_{11}}^2 & H_2^2 \sigma_{\alpha_{11}}\sigma_{\alpha_{12}}\rho & H_2^2 \sigma_{\alpha_{11}}\sigma_{\alpha_{21}}\mu & H_2^2 \sigma_{\alpha_{11}}\sigma_{\alpha_{22}}\rho\mu \\ H_2^2 \sigma_{\alpha_{12}}\sigma_{\alpha_{11}}\rho^* & H_2^2 \sigma_{\alpha_{12}}^2 & H_2^2 \sigma_{\alpha_{12}}\sigma_{\alpha_{21}}\mu\rho^* & H_2^2 \sigma_{\alpha_{12}}\sigma_{\alpha_{22}}\mu \\ H_2^2 \sigma_{\alpha_{21}}\sigma_{\alpha_{11}}\mu^* & H_2^2 \sigma_{\alpha_{21}}\sigma_{\alpha_{12}}\mu^*\rho & H_2^2 \sigma_{\alpha_{21}}^2 & H_2^2 \sigma_{\alpha_{21}}\sigma_{\alpha_{22}}\rho \\ H_2^2 \sigma_{\alpha_{22}}\sigma_{\alpha_{11}}\mu^*\rho^* & H_2^2 \sigma_{\alpha_{22}}\sigma_{\alpha_{12}}\mu^* & H_2^2 \sigma_{\alpha_{22}}\sigma_{\alpha_{21}}\rho^* & H_2^2 \sigma_{\alpha_{22}}^2 \end{bmatrix},$$

where P is a power shaping matrix, C is a lower triangular matrix.

$$C = \begin{bmatrix} H_2\sigma_{\alpha_{11}} & 0 & 0 & 0 \\ H_2\sigma_{\alpha_{12}} & H_2\sigma_{\alpha_{12}}^2\phi & 0 & 0 \\ H_2\sigma_{\alpha_{21}} & 0 & H_2\sigma_{\alpha_{12}}^2\varphi & 0 \\ H_2\sigma_{\alpha_{22}} & H_2\sigma_{\alpha_{22}}\mu^*\phi & H_2\sigma_{\alpha_{22}}\rho^*\varphi & H_2\sigma_{\alpha_{22}}\psi \end{bmatrix}, \quad (51)$$

where $\Phi = \sqrt{1-|\rho|^2}, \phi = \sqrt{1-|\mu|^2}, \psi = \sqrt{1+|\mu|^2|\rho|^2-|\mu|^2-|\rho|^2}$.

Therefore some complex coefficients are derived as following, since W has unit variance.

Then we can have $$\langle H_2\alpha_{11}, H_2\alpha_{11} \rangle = \quad (52)$$

$$\frac{H_2^2 E[\alpha_{11}\alpha_{11}^*]}{H_2^2 \sigma_{\alpha_{11}}^2} = \frac{H_2^2 E[\alpha_{11}w\alpha_{11}w^*]}{H_2^2 \sigma_{\alpha_{11}}^2} = \frac{H_2^2 \sigma_{\alpha_{11}}^2 E[ww^*]}{H_2^2 \sigma_{\alpha_{11}}^2} = 1$$

$$\langle H_2\alpha_{11}, H_2\alpha_{12} \rangle = \quad (53)$$

$$\frac{H_2^2 E[\alpha_{11}\alpha_{12}^*]}{H_2^2 \sigma_{\alpha_{11}}\sigma_{\alpha_{12}}} = \frac{H_2^2 E\left[\sigma_{\alpha_{11}}w\left(\sigma_{\alpha_{12}}\rho^* w + \sigma_{\alpha_{12}}\sqrt{1-|\rho|^2}\,\chi\right)^*\right]}{H_2^2 \sigma_{\alpha_{11}}\sigma_{\alpha_{12}}} =$$

$$\frac{H_2^2 \sigma_{\alpha_{11}}\sigma_{\alpha_{12}}\rho E[ww^*] + H_2^2 \sigma_{\alpha_{11}}\sigma_{\alpha_{12}}\sqrt{1-|\rho|^2}\, E[w\chi^*]}{H_2^2 \sigma_{\alpha_{11}}\sigma_{\alpha_{12}}} = \rho$$

$$\langle H_2\alpha_{11}, H_2\alpha_{21} \rangle = \quad (54)$$

$$\frac{H_2^2 E[\alpha_{11}\alpha_{21}^*]}{H_2^2 \sigma_{\alpha_{11}}\sigma_{\alpha_{11}}} = \frac{H_2^2 E\left[\sigma_{\alpha_{11}}w\left(\sigma_{\alpha_{21}}\mu^* w + \sigma_{\alpha_{21}}\sqrt{1-|\mu|^2}\, y\right)^*\right]}{H_2^2 \sigma_{\alpha_{11}}\sigma_{\alpha_{21}}} =$$

$$\frac{H_2^2 \sigma_{\alpha_{11}}\sigma_{\alpha_{21}}\mu E[ww^*] + H_2^2 \sigma_{\alpha_{11}}\sigma_{\alpha_{21}}\sqrt{1-|\mu|^2}\, E[wy^*]}{H_2^2 \sigma_{\alpha_{11}}\sigma_{\alpha_{21}}} = \mu$$

$$\langle H_2\alpha_{11}, H_2\alpha_{22} \rangle = \frac{H_2^2 E[\alpha_{11}\alpha_{22}^*]}{H_2^2 \sigma_{\alpha_{11}}\sigma_{\alpha_{22}}} = \mu\rho \quad (55)$$

Similarly, the rest correlation terms can be derived and are shown as following:

(50)

$$R_{MIMO} = \begin{bmatrix} 1 & \rho & \mu & \mu\rho \\ \rho^* & 1 & \mu\rho^* & \mu \\ \mu^* & \mu^*\rho & 1 & \rho \\ \mu^*\rho^* & \mu^* & \rho^* & 1 \end{bmatrix}. \quad (56)$$

If $$\sigma_{\alpha_{11}}^2 = \sigma_{\alpha_{12}}^2 = \sigma_{\alpha_{21}}^2 = \sigma_{\alpha_{22}}^2 = \sigma_{\alpha_{11}}\sigma_{\alpha_{11}} = \sigma_{\alpha_{11}}\sigma_{\alpha_{21}} = \sigma_{\alpha_{12}}\sigma_{\alpha_{21}} = \sigma_{\alpha_{12}}\sigma_{\alpha_{22}} = \sigma_{\alpha_{21}}\sigma_{\alpha_{11}} = \sigma_{\alpha_{21}}\sigma_{\alpha_{12}} = \sigma_{\alpha_{21}}\sigma_{\alpha}$$

Then, we have $$R_{MIMO} = R_{T_x} \otimes R_{R_x} = CC^T, \quad (57)$$

where $\otimes$ is the Kronecker product, C is a lower triangular Cholesky factorization matrix.

CONCLUSION

The circulant Hadamard conjecture presumes the existence of real Hadamard matrices in every doubly even order, while Ryser conjectured that there does not exist any circulant real Hadamard matrix of order n>4. We have proved the circulant Hadmard conjecture, based on the generalized Hadmard which called the block circulant Jacket matrix, also proposed a new class of block circulant Jacket matrices of order N=2p, $4p, 4^k p, np$. Since the transform is the Jacket matrix, the inverse transform could be easily obtained by the reciprocal transpose operations. The orthogonal BCJM of the present disclosure is a fast efficient algorithm with complexity reduced by nearly 50% when it applies to the multiplications for the certain case. Finally, we have applied the BCJM to the time-invariant Gaussian MIMO channel. We have compared the channel of Toeplitz matrix and the low correlation block circulant Jacket matrix. The simulation has shown that the methods of the present disclosure can improve the channel capacity at the high SNR regime.

Although a few embodiments of the present disclosure have been shown and described, it would be appreciated by those skilled in the art that changes may be made in this embodiment without departing from the principles and spirit of the invention, the scope of which is defined in the claims and their equivalents.

What is claimed is:

1. A multi-input and multi-output (MIMO) communication method of a MIMO communication apparatus having receive antennas and a receive end, comprising:
   receiving, by the receive antennas of the MIMO apparatus, a transmit signal; and
   estimating, by the receive end of the MIMO apparatus, a channel using a receive signal received through the receive antennas,
   wherein the estimating estimates the channel using formula:

$$Y = \sqrt{\frac{E_x}{N_T}} HX + Z$$

Y being the receive signal, $E_x$ being an energy of the transmit signal, $N_T$ being a number of transmit antennas, X being the transmit signal, Z being noise, and H being a channel matrix comprising a BCJM (Block Circulant Jacket Matrix) of order n (>4),
   wherein the H is expressed by formula:

$H = R_r^{1/2} H_w R_t^{1/2}$, $R_r^{1/2}$ being a matrix where correlation between transmit antennas are reflected,
   $H_w$ being a channel gain matrix, and
   $R_t^{1/2}$ being a matrix where a correlation between receive antennas is reflected,
   wherein the $R_t$ is expressed by the BCJM.

2. The method according to claim 1, wherein the BCJM is $[C]_{np}$ in $$[C]_{np} = \begin{pmatrix} C_0 & C_1 & C_2 & C_3 & \ldots & C_{n-2} & C_{n-1} \\ C_{n-1} & C_0 & C_1 & C_2 & \ldots & C_{n-3} & C_{n-2} \\ \ldots & \ldots & \ldots & \ldots & \ddots & \ldots & \ldots \\ C_1 & C_2 & C_3 & C_4 & \ldots & C_{n-1} & C_0 \end{pmatrix}$$

$C_0, \ldots, C_{n-1}$ being a p×p packet matrix.

3. The method according to claim 1, wherein the BCJM is a block circulant jacket matrix $[C]_{4p}$ of order 4p of $$[C]_{4p} = \begin{pmatrix} C_0 & C_1 & C_2 & C_3 \\ C_3 & C_0 & C_1 & C_2 \\ C_2 & C_3 & C_0 & C_1 \\ C_1 & C_2 & C_3 & C_0 \end{pmatrix}$$

$C_i$(i=0,1,2,3) being a p×p packet matrix.

4. A multi-input and multi-output (MIMO) communication apparatus comprising:
   $N_R$ receive antennas for receiving a transmit signal from a transmit end; and
   a receive end for estimating a channel using a receive signal received through the receive antennas,
   wherein the receive end estimates the channel using formula:

$$Y = \sqrt{\frac{E_x}{N_T}} HX + Z$$

Y being the receive signal, $E_x$ being an energy of the transmit signal, $N_T$ being a number of transmit antennas, X being the transmit signal, Z being noise, and H being a channel matrix comprising a BCJM (Block Circulant Jacket Matrix) of order n (>4),
   wherein the H is expressed by formula:

$H = R_r^{1/2} H_w R_t^{1/2}$, $R_r^{1/2}$ being a matrix where correlation between transmit antennas are reflected,
   $H_w$ being a channel gain matrix, and
   $R_t^{1/2}$ being a matrix where a correlation between receive antennas is reflected,
   wherein the $R_t$ is expressed by the BCJM.

* * * * *